(12) United States Patent
Huff et al.

(10) Patent No.: US 9,960,396 B2
(45) Date of Patent: May 1, 2018

(54) MODULE BACKBONE SYSTEM

(71) Applicant: Artisan Vehicle Systems Inc., Camarillo, CA (US)

(72) Inventors: Brian R. Huff, Newbury Park, CA (US); Mike Kasaba, Malibu, CA (US); Russell Davis, Thousand Oaks, CA (US)

(73) Assignee: Artisan Vehicle Systems Inc., Camarillo, CA (US)

(*) Notice: Subject to any disclaimer, the term of this patent is extended or adjusted under 35 U.S.C. 154(b) by 756 days.

(21) Appl. No.: 14/494,133

(22) Filed: Sep. 23, 2014

(65) Prior Publication Data

US 2015/0086825 A1    Mar. 26, 2015

Related U.S. Application Data

(60) Provisional application No. 61/960,715, filed on Sep. 24, 2013.

(51) Int. Cl.
*H01M 2/10* (2006.01)
*H01M 2/20* (2006.01)

(52) U.S. Cl.
CPC ......... *H01M 2/1077* (2013.01); *H01M 2/206* (2013.01); *H01M 2220/10* (2013.01)

(58) Field of Classification Search
None
See application file for complete search history.

(56) References Cited

U.S. PATENT DOCUMENTS

| 4,180,845 | A | 12/1979 | Shariff et al. |
| 6,121,695 | A | 9/2000 | Loh |
| 6,205,029 | B1 | 3/2001 | Byrne et al. |
| 6,261,719 | B1* | 7/2001 | Ikeda ............... H01M 2/202 429/120 |
| 6,275,003 | B1 | 8/2001 | Marukawa et al. |
| 6,678,972 | B2 | 1/2004 | Naruse et al. |
| 7,471,066 | B2 | 12/2008 | Ambrosio et al. |
| 7,740,981 | B2 | 6/2010 | Hashida et al. |
| 7,808,131 | B2 | 10/2010 | Hurst et al. |
| 7,834,589 | B2 | 11/2010 | Park et al. |
| 7,911,079 | B2 | 3/2011 | Hoff et al. |
| 8,120,322 | B2 | 2/2012 | Lee et al. |
| 8,253,378 | B2 | 8/2012 | Lee et al. |
| 8,718,845 | B2 | 5/2014 | Onsager et al. |
| 8,831,805 | B2 | 9/2014 | Izumi et al. |
| 8,878,492 | B2 | 11/2014 | Furukawa et al. |

(Continued)

FOREIGN PATENT DOCUMENTS

EP    2523246    11/2012
JP    2009213299 A    9/2009
(Continued)

*Primary Examiner* — Jonathan Crepeau
(74) *Attorney, Agent, or Firm* — Plumsea Law Group, LLC

(57) ABSTRACT

An apparatus and battery system are disclosed. The apparatus includes a first panel, a first bus bar, and a second panel. The first panel includes a first upper surface and a first lower surface. The first upper surface includes a first cavity extending into the first upper surface towards the first lower surface. The first bus bar is within the first cavity. The second panel has a second lower surface in direct contact with the first upper surface. The second lower surface extends over a substantial portion of the first cavity.

16 Claims, 32 Drawing Sheets

(56) References Cited

U.S. PATENT DOCUMENTS

| | | |
|---|---|---|
| 8,999,555 B2 | 4/2015 | Kume et al. |
| 2009/0252994 A1 | 10/2009 | Livingston |
| 2011/0287299 A1 | 11/2011 | Kim |
| 2011/0300433 A1 | 12/2011 | Kim |
| 2012/0112688 A1 | 5/2012 | Ho |
| 2013/0130071 A1 | 5/2013 | Adachi et al. |
| 2013/0154569 A1 | 6/2013 | Endo et al. |
| 2013/0175865 A1 | 7/2013 | Wang et al. |
| 2013/0177795 A1 | 7/2013 | Power et al. |
| 2013/0216874 A1 | 8/2013 | Endo et al. |
| 2013/0243557 A1 | 9/2013 | Hiroki et al. |
| 2013/0257323 A1 | 10/2013 | Diamond et al. |
| 2013/0278218 A1 | 10/2013 | Onnerud et al. |
| 2013/0288096 A1 | 10/2013 | Frutschy et al. |
| 2014/0158396 A1 | 6/2014 | Nakayama |
| 2014/0176073 A1 | 6/2014 | Shrinkle |
| 2014/0287278 A1 | 9/2014 | Despesse |
| 2014/0347060 A1 | 11/2014 | Carkner et al. |

FOREIGN PATENT DOCUMENTS

| | | |
|---|---|---|
| KR | 100969589 B1 | 7/2010 |
| WO | 2011008736 | 1/2011 |

* cited by examiner

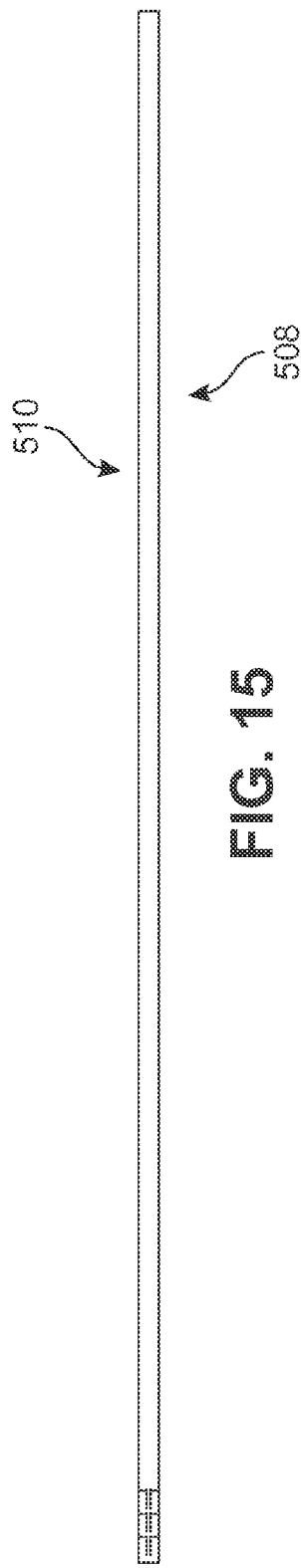
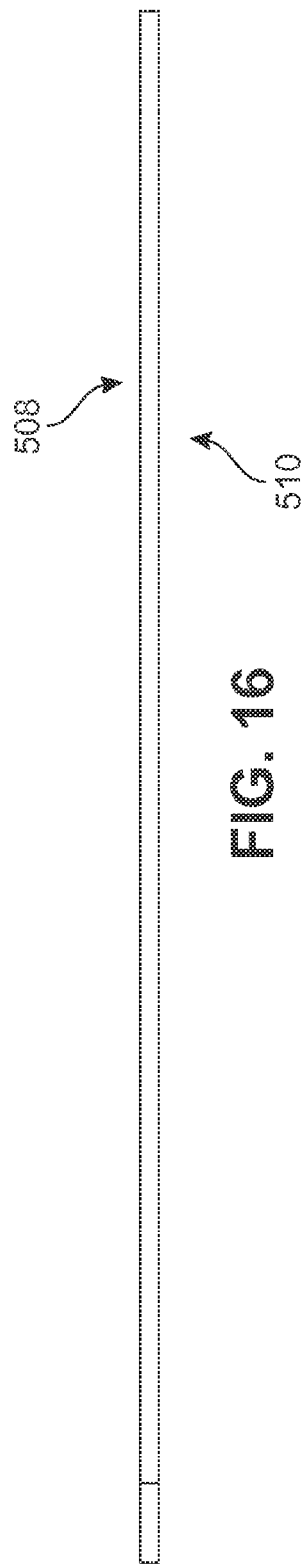

MODULE BACKBONE SYSTEM

CROSS-REFERENCE TO RELATED APPLICATION(S)

This application claims the benefit under 35 U.S.C. 119(e) to application Ser. No. 61/960,715 titled "Module Backbone System" and filed on Sep. 24, 2013, the entirety of which is incorporated herein by reference. Moreover, this application is related to application Ser. No. 61/962,329 titled "Charger to Vehicle Remote Access System" and filed on Nov. 4, 2013, the entirety of which is incorporated herein by reference. Further, this application is related to application Ser. No. 61/965,606 titled "Separate Traction/Hydraulic Drive Systems" and filed on Feb. 3, 2014, the entirety of which is incorporated herein by reference. Additionally, this application is related to application Ser. No. 61/997,186 titled "Module Maintenance System" and filed on May 23, 2014, the entirety of which is incorporated herein by reference.

BACKGROUND OF THE INVENTION

1. Field of the Invention

The present invention relates to a battery system (e.g., battery pack), particularly a battery system for high voltage applications.

2. Description of Related Art

Some battery systems utilize an exposed bus bar. In such systems, a single cell of a pack of cells may be replaced by accessing the exposed bus bar. However, maintenance of such systems may be expensive and time consuming. For example, such systems may require a trained technician and specialized equipment due to a risk of accidental contact with the exposed bus bar. Moreover, such systems may require access to tools and equipment found in a laboratory remote from the battery system. Furthermore, such systems may require the entire pack to be offline during repairs.

Therefore, there is a need in the art for a battery system that is easier to repair, requires less sophisticated equipment, and has a reduced offline time for repairs.

SUMMARY OF THE INVENTION

The proposed invention is directed to a battery system. In one exemplary embodiment, a battery system is formed of 144 cells, but this technology can use a pack having any number of cells. Moreover, in the exemplary embodiment, the battery system uses a pack formed of 12 modules, but this technology can use a pack having any number of modules (e.g., 2-16). In one example, a battery module has a nominal voltage of 40 volts (V), 260 ampere-hour (Ah), and 10 kilowatt hour (kWh). Further, this system may use various battery cell types, manufacturers, technologies, etc.

Embodiments include a bus bar system flexibly connected to a panel. In one embodiment, a first panel and a second panel may prevent contact with a bus bar system to simplify repair. Moreover, in some embodiments, coupling elements used to connect a battery system to the bus bar system are configured to prevent accidental contact. Accordingly, in some instances, replacement of one or more batteries of a battery system may be quickly and easily replaced without sophisticated equipment or technical expertise.

In one aspect, an apparatus includes a first panel, a first bus bar, and a second panel. The first panel includes a first upper surface and a first lower surface. The first upper surface includes a first cavity extending into the first upper surface towards the first lower surface. The first bus bar is within the first cavity. The second panel has a second lower surface in direct contact with the first upper surface. The second lower surface extends over a substantial portion of the first cavity.

In another aspect, an apparatus includes a first panel, a first bus bar, a second panel, and a second bus bar. The first panel includes a first upper surface and a first lower surface. The first upper surface includes a first cavity extending into the first upper surface towards the first lower surface. The first upper surface includes a second cavity extending into the first upper surface towards the first lower surface. The first cavity is spaced from the second cavity. The first bus bar is within the first cavity. The second bus bar is within the second cavity. The second bus bar is configured to move within the second cavity. The second panel has a second lower surface into direct contact with the first upper surface. The second lower surface extends over a substantial portion of the first cavity. The second lower surface extends over a substantial portion of the second cavity.

In yet another aspect, a battery system includes a backbone, a first bay, and a second bay. The backbone includes a first panel, a first bus bar, and a second panel. The first panel includes a first upper surface and a first lower surface. The first upper surface includes a first cavity extending into the first upper surface towards the first lower surface. The first bus bar is within the first cavity. The first bus bar includes a first coupling element and a second coupling element. The second panel has a second lower surface in direct contact with the first upper surface. The second lower surface extends over a substantial portion of the first cavity. The first bay is for a first battery module and includes a first guide pin. The first coupling element extends into the first bay. The second bay is for a second battery module and includes a second guide pin. The second coupling element extends into the second bay.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 15 is a schematic view of a top of the backbone of FIG. 14, in accordance with an exemplary embodiment;

FIG. 16 is a schematic view of a bottom of the backbone of FIG. 14, in accordance with an exemplary embodiment;

DETAILED DESCRIPTION

Figure 1:
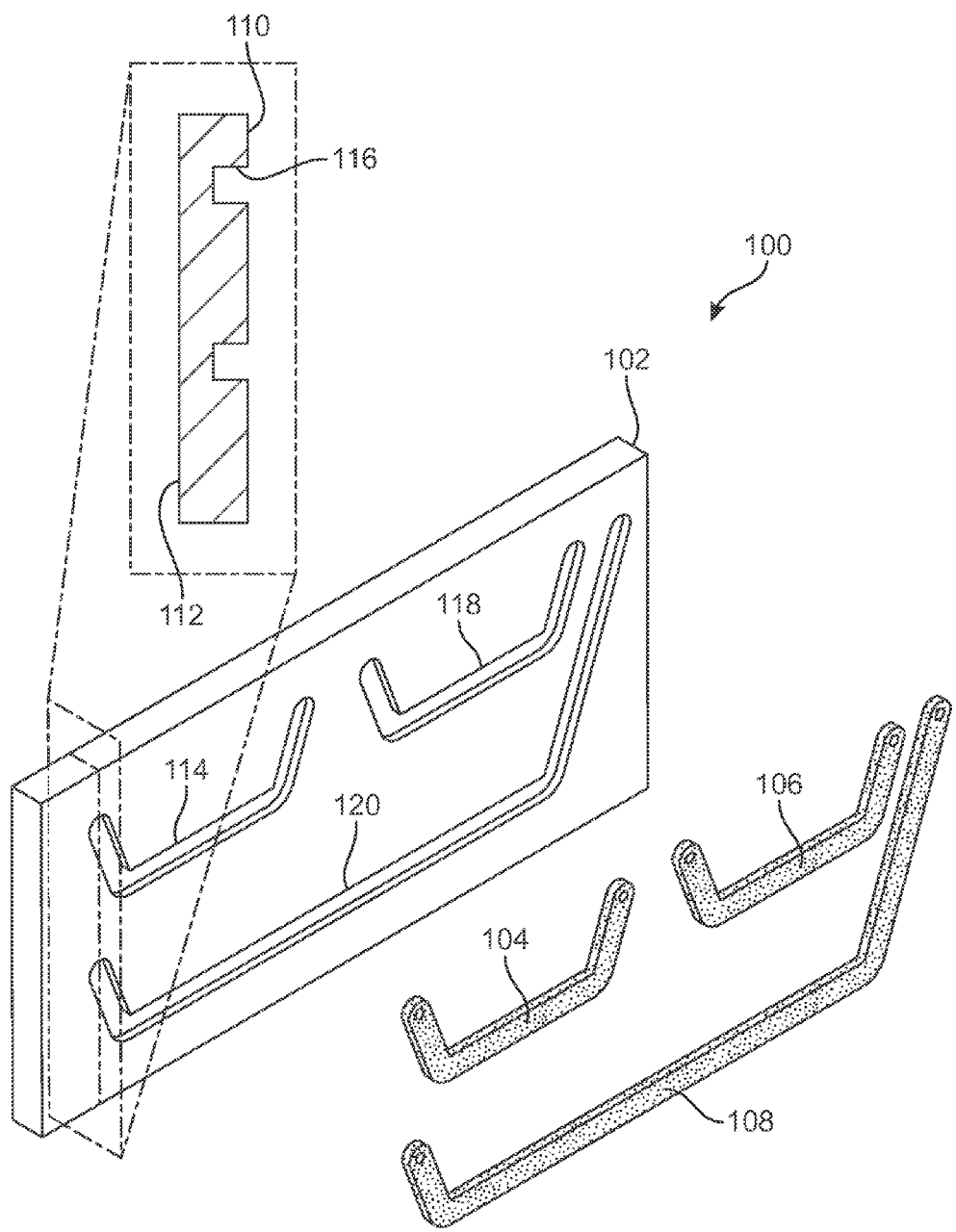
FIG. 1 is a schematic view of a backbone, in accordance with an exemplary embodiment.

FIG. 1 illustrates components for a backbone system 100 including a first panel 102, a first bus bar 104, a second bus bar 106, and a return bus bar 108. As shown, the first panel 102 includes a first upper surface 110 and a first lower surface 112.

As previously noted, in some instances, it is desirable to confine a bus bar within a cavity to improve safety and to prevent dust and dirt from accumulating onto the bus bar. Accordingly, in some embodiments, the first upper surface 110 includes a first cavity 114. The first cavity 114, as shown, may extend into the first upper surface 110 towards the first lower surface 112. In some embodiments, the first cavity 114 includes an inner surface 116. As such, the first cavity may allow movement of the first bus bar 104 within the first cavity 114 thereby confining the first bus bar 104 within the first cavity 114.

Similarly, in some embodiments, the first upper surface includes a second cavity to confine the second bus bar and/or the first upper surface includes a return cavity to confine the return bus bar. For example, as shown in FIG. 1, the first upper surface 110 includes a second cavity 118 to confine the second bus bar 106 and/or the first upper surface includes a return cavity 120 to confine the return bus bar 108. In some embodiments, the second cavity and/or the return cavity are similar to the first cavity. For example, the second cavity 118 has an inner surface and/or the return cavity 120 has an inner surface. In other embodiments, the second cavity and the first cavity are different and/or the return cavity and the first cavity are different. In some embodiments, the various cavities of the first panel are coplanar. For example, as shown in FIG. 1, the first cavity 114 is coplanar with the second cavity 118.

The various bus bars may be formed of various materials and techniques, and may have various properties. For example, the first bus bar 104 may be formed of a conductive material such as copper, aluminum, etc. Moreover, the first bus bar 104 may be formed to have any thickness, length, height, weight, etc. Further, the various bus bars may be rigid. As used herein, a rigid bus bar may have a Young's modulus of greater than 50 GPa, greater than 69 GPa, greater than 117 GPa, etc.

Figure 2:
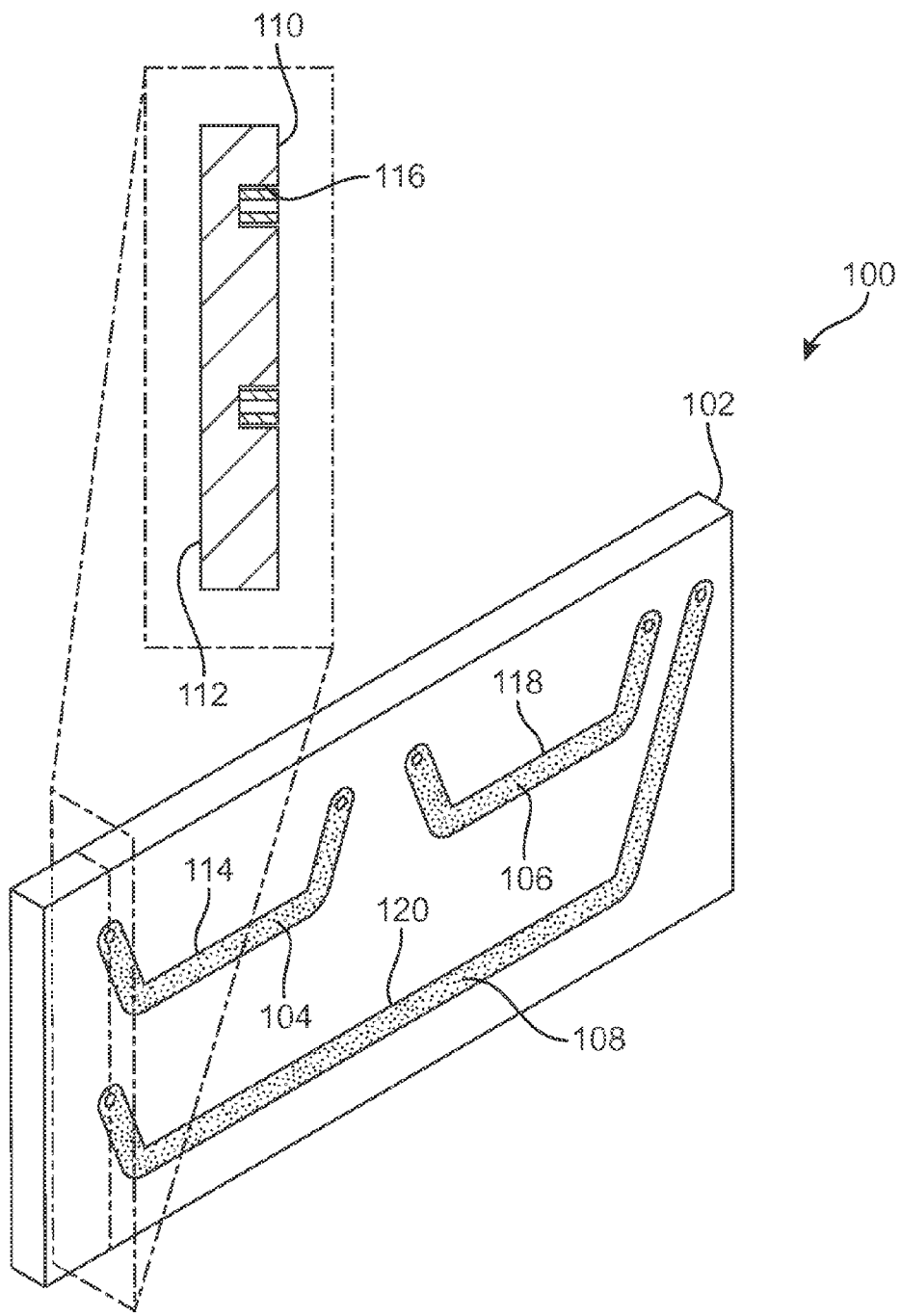
FIG. 2 is a schematic view of the backbone of FIG. 1 with a bus bar in a first cavity, in accordance with an exemplary embodiment.

In some embodiments, the first bus bar is contained within the inner surface. For example, as shown in FIG. 2, the first bus bar 104 is contained within the inner surface 116. Similarly, in some embodiments, the second bus bar is contained within an inner surface of the second cavity and/or the return bus bar is contained within an inner surface of the return cavity. In some embodiments, the first bus bar is between the first upper surface and the first lower surface. For example, as shown, the first bus bar 104 is between the first upper surface 110 and the first lower surface 112. Likewise, in some embodiments, the second bus bar is between the first upper surface and the first lower surface and/or the return bus bar is between the first upper surface and the first lower surface.

Figure 3:
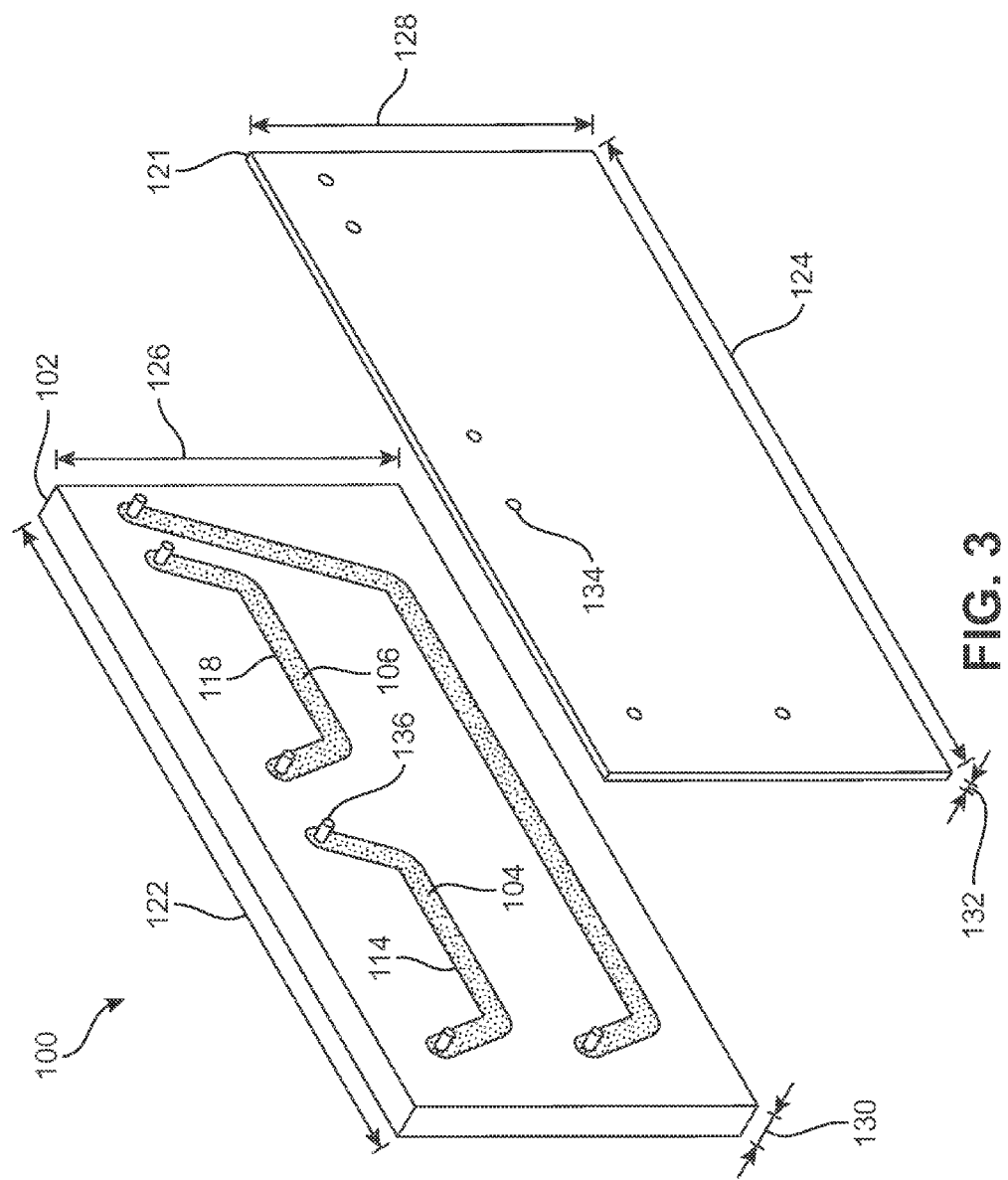
FIG. 3 is a schematic view of the backbone of FIG. 1 with a second panel, in accordance with an exemplary embodiment.
Figure 4:
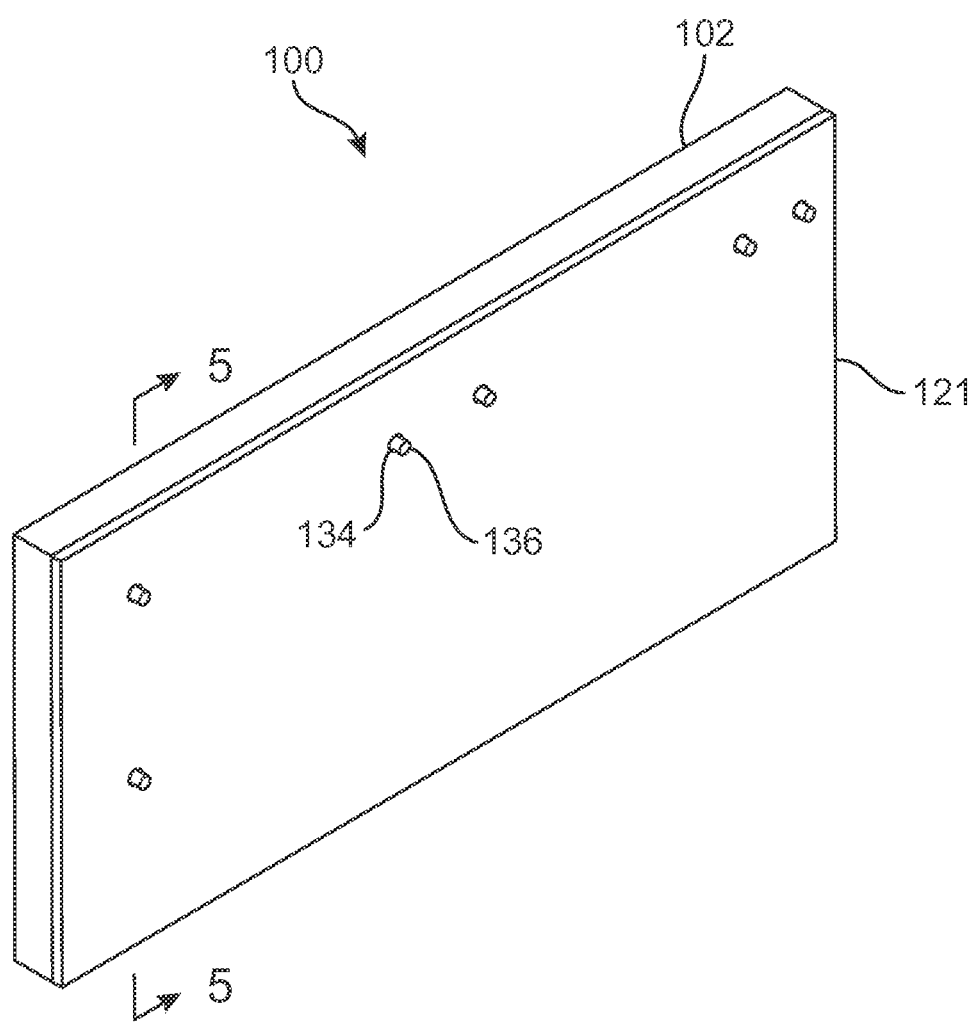
FIG. 4 is a schematic view of the backbone of FIG. 1 with a second panel in contact with a first panel, in accordance with an exemplary embodiment.

In one embodiment, a second panel may be provided to extend over the first cavity. For example, as shown in FIG. 3, second panel 121 is provided over the first cavity 114. In some embodiments, the second panel extends over a substantial portion of the first cavity. As used herein, a panel extends over a substantial portion of a cavity when the panel extends over more than eighty percent of a surface area of the cavity, more than ninety percent of a surface area of the cavity, more than ninety-five percent of a surface area of the cavity, etc. For example, as shown in the example, the second panel 121 extends over more than eighty percent of a surface area of the first cavity 114.

In some embodiments, the first panel and the second panel have different widths. For example, the first panel 102 has a first width 130 different from a second width 132 of the second panel 121. In other embodiments, the first panel and the second panel have similar widths. For example, the first panel 102 may have a first width 130 substantially equal to a second width 132 of the second panel 121 (not shown). As used herein, widths are substantially equal when a difference between the widths is less than ten percent. In another embodiment, the first panel and the second panel have similar heights. For example, the first panel 102 has a first height 126 substantially equal to a second height 128 of the second panel 121. As used herein, heights are substantially equal when a difference between the heights is less than ten percent. In various embodiments, the first panel and the second panel have similar lengths. For example, the first panel 102 has a first length 122 substantially equal to a second length 124 of the second panel 121. As used herein, lengths are substantially equal when a difference between the lengths is less than ten percent. In other embodiments, the first panel and the second panel have different lengths.

As used herein the various panels, such as the first panel, the second panel, the third panel, etc., may include any number of sub-panels and may be manufactured using various techniques. In one example, the first panel 102 is formed using a single sub-panel having the first cavity 114, for example, using a molding process. In another example, the first panel 102 is formed by etching a first cavity 114 into a single planar sub-panel. As noted above, in some instances, a panel includes more than one sub-panel. For example, the first panel 102 may be manufactured using a base sub-panel extending between the lower surface and a bottom surface of the first cavity, and an outer sub-panel extending from the base sub-panel. As such, the first panel 102 may be manufactured using two planar sub-panels. In some instances, a panel may include a back side having a back cavity (see FIG. 11). In such instances, the first panel may include any number of sub-panels. For example, a back sub-panel and a front sub-panel may abut where the exposed side of the back sub-panel includes the back cavity and where the exposed side of the front sub-panel includes the first cavity. In other instances, the first panel may include more than two panels. For example, the first panel 102 may include a base sub-panel extending between a bottom surface of the back cavity and a bottom surface of the first cavity, a front outer sub-panel extending from the base sub-panel, and a back outer sub-panel extending from the base sub-panel. As such, the first panel 102 may be manufactured using three planar sub-panels.

In some embodiments, the bus bar is approximately the size of the cavity. As used herein, a bus bar is approximately the size of a cavity when a difference in size between a bus bar and a cavity is less than 10 percent, less than 5 percent, less than 1 percent, etc. Accordingly, the bus bar, when positioned within a cavity, may be aligned for a connection. For example, the first bus bar 104 may be positioned tightly into the first cavity 114 to ensure a position for a connection with a battery module. As noted above, the first bus bar 104 may be rigid. In such instances, such a positioning of the first bus bar 104 may ensure the connection without a flexibility of the first bus bar 104. In other instances, a connection element, such as a signal wire, may be flexible. Accordingly, a connection element may be smaller than a cavity to allow a movement in a first direction and/or a second direction. Such a movement may accommodate a connection. In certain embodiments, a connection element is configured to move in a first direction. For example, the connection element may move parallel to the first width 130 of the first panel 102 and/or the second width 132 of the second panel 121. In some embodiments, a connection element is configured to move in a second direction. For example, the connection element may move parallel to the first height 126 of the first panel 102 and/or to the second height 128 of the second panel 121. As shown in FIG. 3, the first direction and the second direction may be perpendicular. Moreover, in various embodiments, a connection element is configured to move in a third direction. For example, the first bus bar 104 may move parallel to the first length 122 of the first panel 102 and/or to the second length 124 of the second panel 121. As shown in FIG. 3, the third direction may be perpendicular to the first direction and the third direction may be perpendicular to the second direction.

In certain embodiments, the second panel may include an opening for a coupling element. For example, as shown in FIG. 3, the second panel 121 may include opening 134 for a coupling element 136. In some embodiments, the coupling element extends outward from the first upper surface. For example, the coupling element 136 extends outward from the first upper surface 110. Similarly, the second panel may include any number of openings for any number of coupling elements. For example, the second panel may include a second opening for a second coupling element of the first bus bar 104 and/or the second panel may include a third opening for a third coupling element of the second bus bar 106. In another example, the second panel includes no openings (see FIG. 6).

As noted above, in some instances, it is desirable for the cavity to position the coupling element for a connection. In some embodiments, a cavity may position a coupling element to align with an opening in a second panel. For example, the first cavity 114 may position the coupling element 136 to align with the opening 134 of the second panel 121 (see FIGS. 1-5). In other embodiments, a cavity may position a coupling element to align with a back opening in a first panel. For example, a first cavity may position the back coupling element 208 to align with the back opening 206 of the first panel 202 (see FIGS. 6-7). Similarly, in some embodiments, a cavity may position a coupling element to align with a terminal. For example, the first cavity 114 may position the coupling element 136 to align with a first terminal. As discussed further, such a terminal may be positioned by a guide pin.

Figure 5:
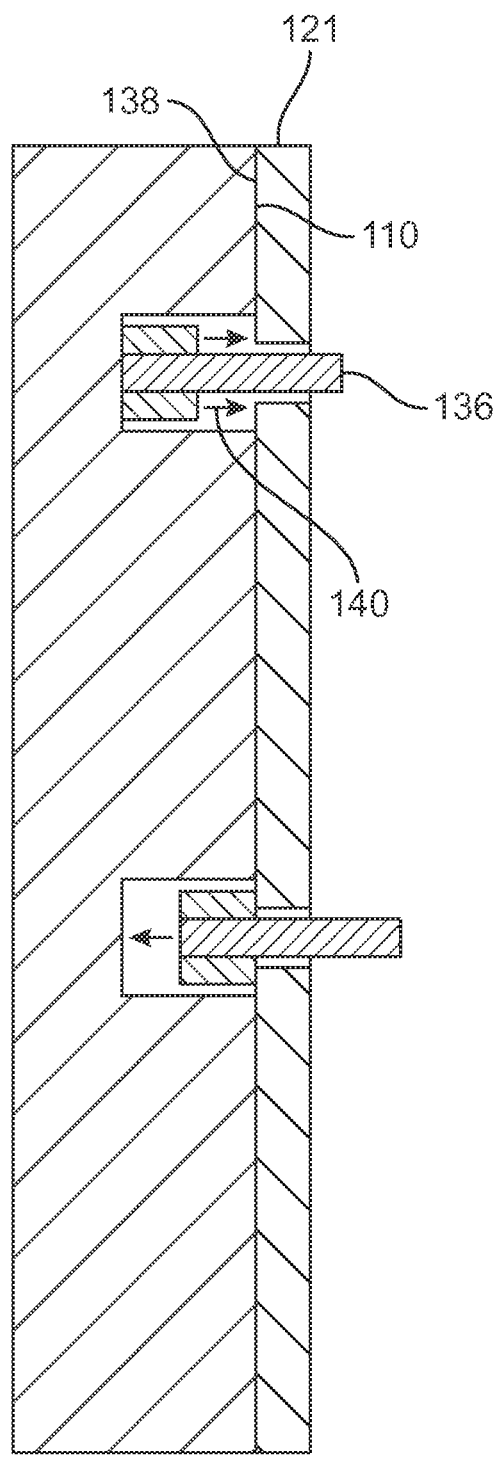
FIG. 5 is a cross-sectional view of the backbone of FIG. 4, in accordance with an exemplary embodiment.

In certain embodiments, the second panel is in direct contact with the first panel. For example, the second panel 121 directly contacts the first panel 102 (see FIGS. 3-4). Moreover, in various embodiments, the second panel includes a second lower surface that directly contacts the first upper surface. For example, as shown in FIG. 5, the second panel 121 includes a second lower surface 138 that directly contacts the first upper surface 110.

In some instances, it is desirable to allow the coupling element to move in a direction normal to the first upper surface. For example, as shown in FIG. 5, the coupling element 136 is configured to move in a third direction 140 between the first upper surface 110 and the second lower surface 138. In some embodiments, the third direction is perpendicular to the first direction and the third direction is perpendicular to the second direction.

Figure 6:
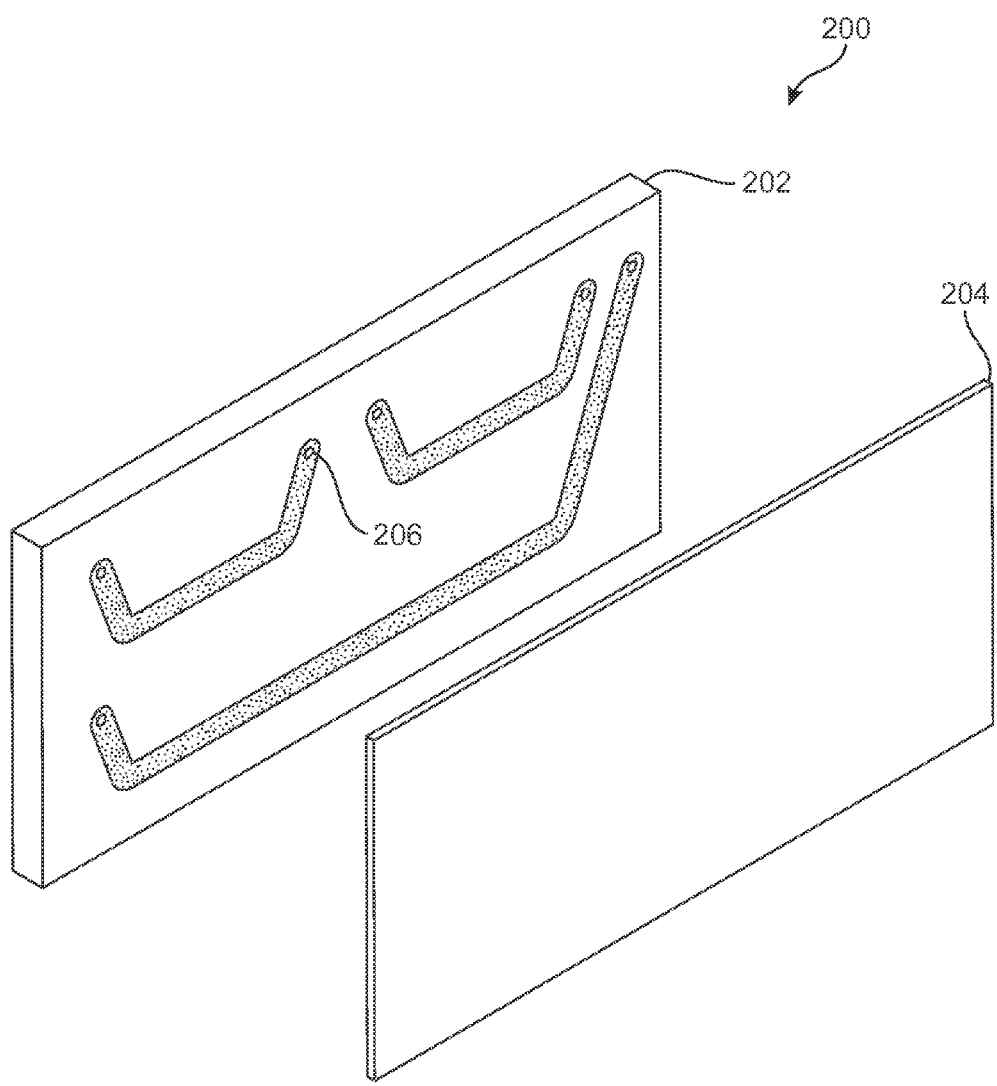
FIG. 6 is a schematic view of a backbone having coupling elements extending through a first panel, in accordance with an exemplary embodiment.
Figure 7:
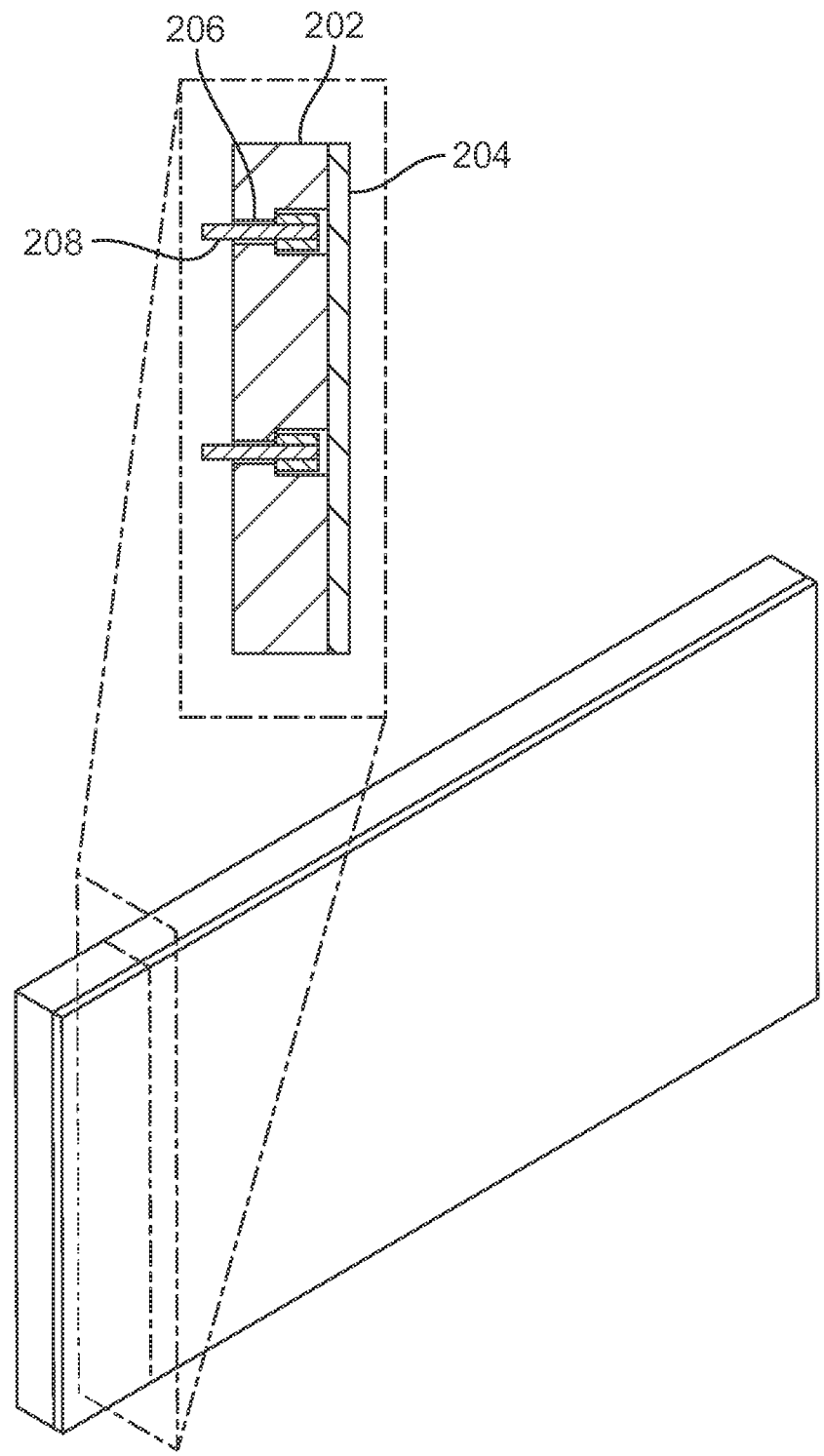
FIG. 7 is a schematic view of the backbone of FIG. 6 with a second panel in contact with a first panel, in accordance with an exemplary embodiment.

In certain instances, it is desirable to provide a back opening in the first panel to simplify a manufacturing of the second panel. For example, as shown in FIG. 6, the backbone 200 includes first panel 202 and a second panel 204. In some embodiments, the first panel 202 is substantially similar to the first panel 102 except that the first panel 102 further includes back opening 206. Similarly, in various embodiments, the second panel 204 is similar to the second panel 121 except that the second panel 204 omits the opening 134. Accordingly, as shown in FIG. 7, the back opening 206 may position the back coupling element 208 similarly to the coupling element 136, thereby aligning the back coupling element 208 for a connection. Moreover, in some embodiments, the back coupling element extends outward from the first lower surface. For example, the back coupling element 208 extends outward from the first upper surface.

Figure 8:
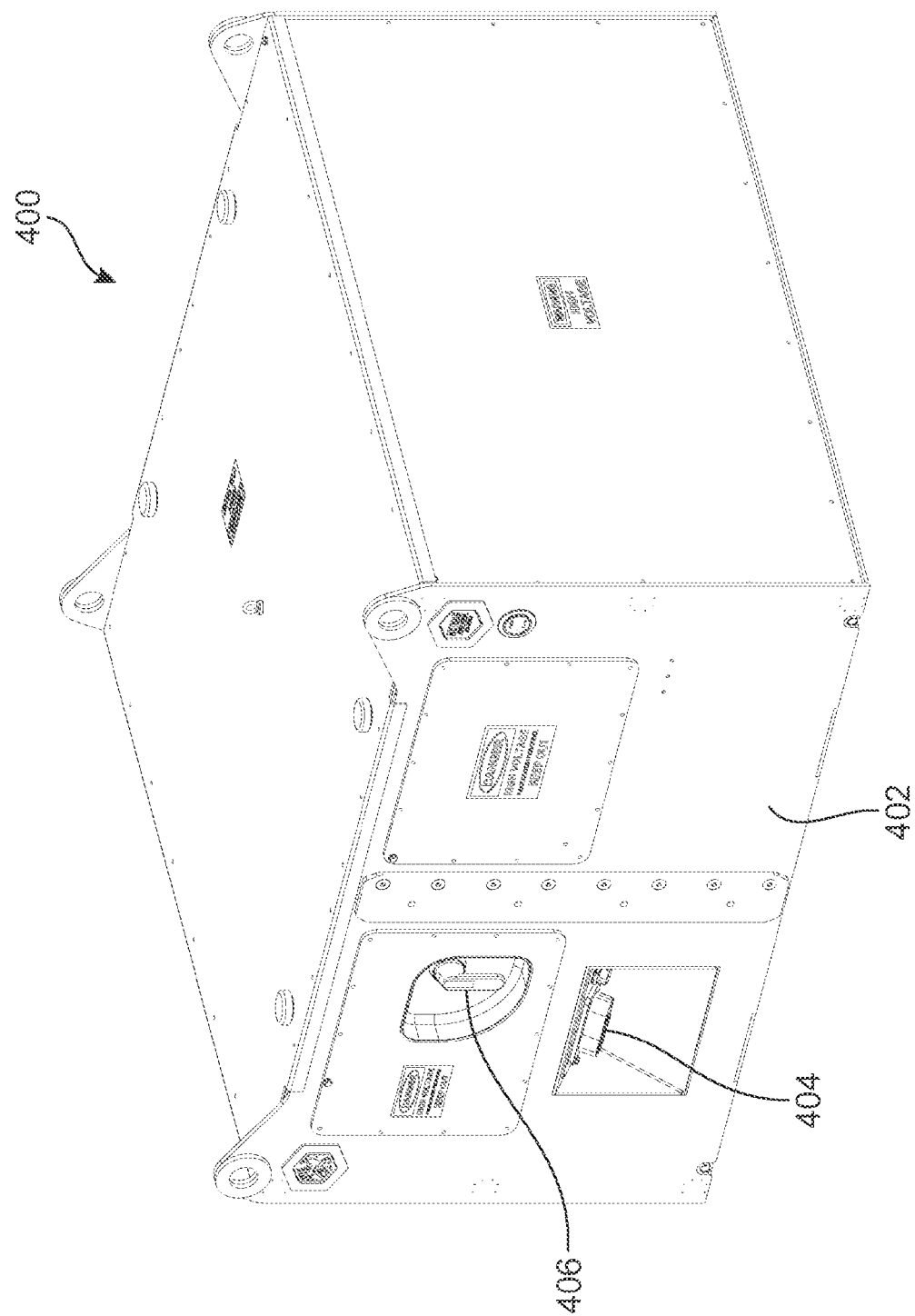
FIG. 8 is an isometric view of a battery system, in accordance with an exemplary embodiment.

FIG. 8 illustrates a battery system 400, in accordance to an exemplary embodiment. The battery system 400 is suitable for a variety of fields, activities, and applications, including, but not limited to, hybrid vehicles, electric vehicles, mining equipment, pumps, compressors, and the like. For example, in some embodiments, the battery system 400 contains 12 modules and 132 battery cells. Moreover, in the example, the battery system 400 may output 480 volts.

In some embodiments, the battery system includes an interface panel. For example, as illustrated, the battery system 400 includes an interface panel 402 having a high voltage output 404. As used herein, a high voltage exceeds an operating voltage of 50 volts. In some instances, a high voltage exceeds 120 volts, exceeds 240 volts, or exceeds 480 volts. As shown, in some embodiments, the interface panel 402 further includes a disconnect switch 406 to disconnect the high voltage output 404. For example, the disconnect switch 406 may be used to allow a replacement of a battery cell of the battery system 400.

Figure 9:
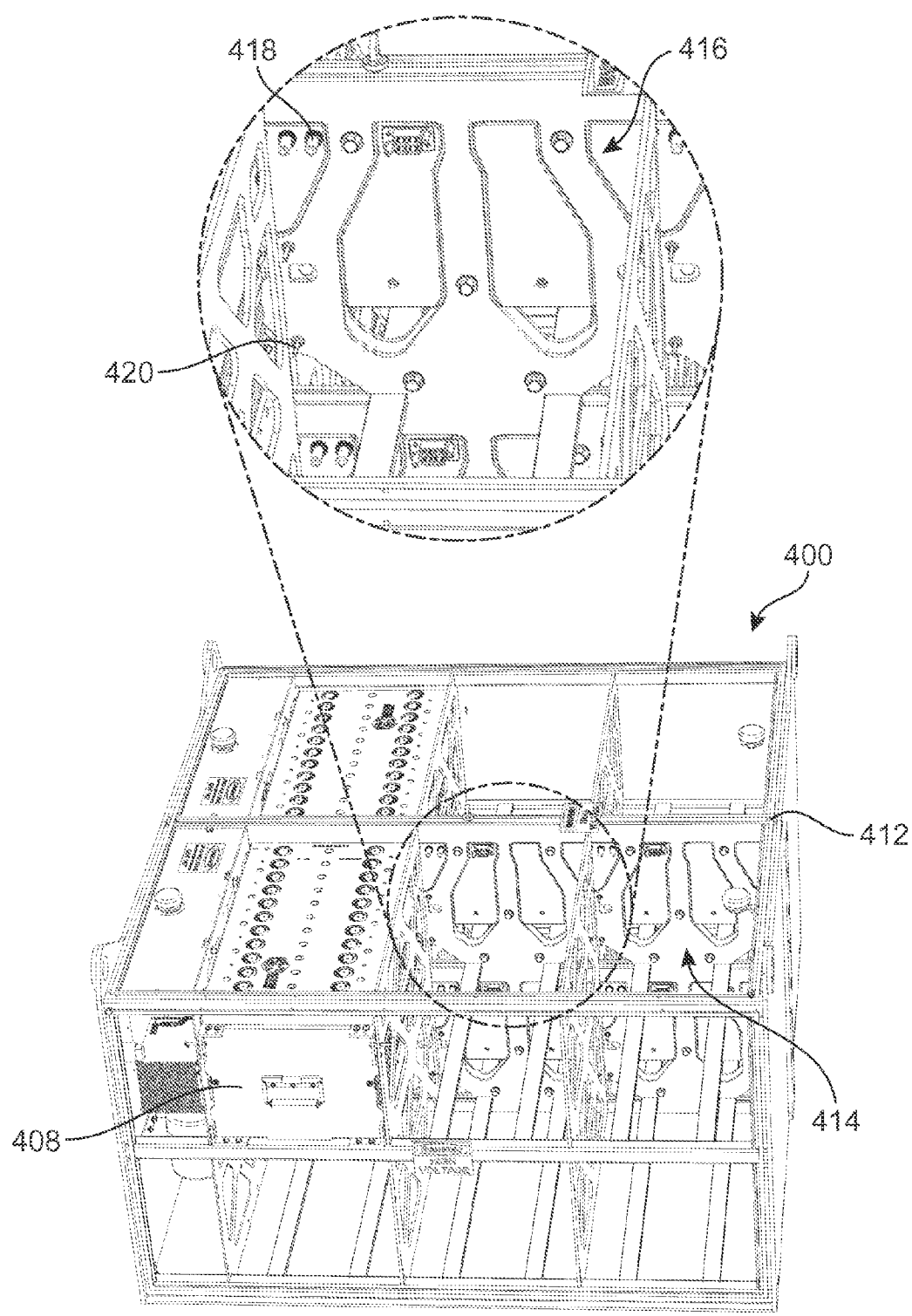
FIG. 9 is a schematic view of the battery system of FIG. 8, in accordance with an exemplary embodiment.

In some embodiments, it is desirable for the battery system to include a battery module to simplify a replacement of a battery cell. As shown in FIG. 9, the battery system 400 includes a battery module 408. FIG. 9 illustrates two battery modules for illustration purposes only. For example, in some embodiments, the battery system 400 includes none, one, or more than two battery modules.

In some instances, the battery system includes a housing configured to receive a battery module. For example, as shown in FIG. 9, the battery system 400 includes housing 412. Such a housing may be configured to receive any number of battery modules. For example, as shown, the housing 412 includes a bay 414. In other embodiments, the housing 412 includes fewer than 12 bays (e.g., 2, 3, 4, 5, etc.), or more than 12 bays (e.g., 13, 14, 15, etc.).

In various embodiments, the battery system includes a backbone system to electronically connect battery modules to the battery system. For example, as shown in FIG. 9, battery system 400 includes a backbone system 416. As discussed further below, the backbone system 416 may be used to electronically connect battery modules using a bus bar system.

In some embodiments, the backbone system includes a coupling element to safely connect a module to the backbone system. For example, as shown in FIG. 9, the backbone system 416 includes a coupling element 418. As discussed further below, the coupling element 418 may be configured to be electronically insulated when disconnected from a battery module (e.g., 408) in order to provide improved safety.

In some embodiments, the housing includes guide pins to guide connections of the battery modules and to protect connections of the battery modules. For example, as shown in FIG. 9, the housing 412 includes guide pin 420. As discussed further below, the guide pin may be used to guide a battery module into a bay of the housing and may be used to bear weight of the module in order to protect a coupling element.

FIGS. 10-18 illustrate a backbone system 500, in accordance to an exemplary embodiment. In some embodiments, the backbone system 500 is similar to the backbone system 416 of FIG. 9 and/or the backbone system 100 of FIGS. 1-5. For example, the backbone system 500 may be configured for the housing 412 and the battery module 408. In other embodiments, the backbone system 500 is different than the backbone system 416 and/or the backbone system 100.

Figure 10:
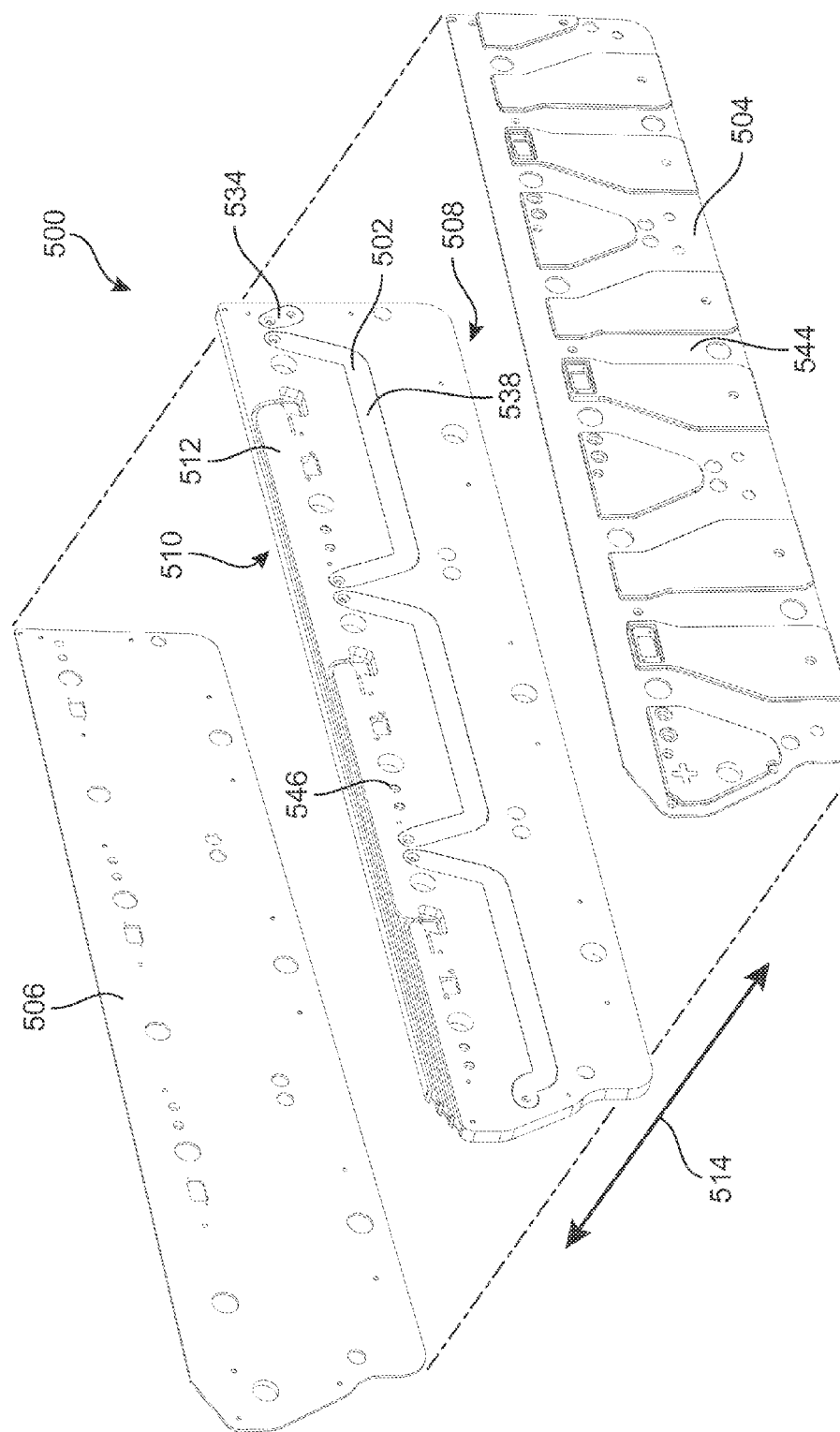
FIG. 10 is a first exploded view of a backbone, in accordance with an exemplary embodiment.
Figure 13:
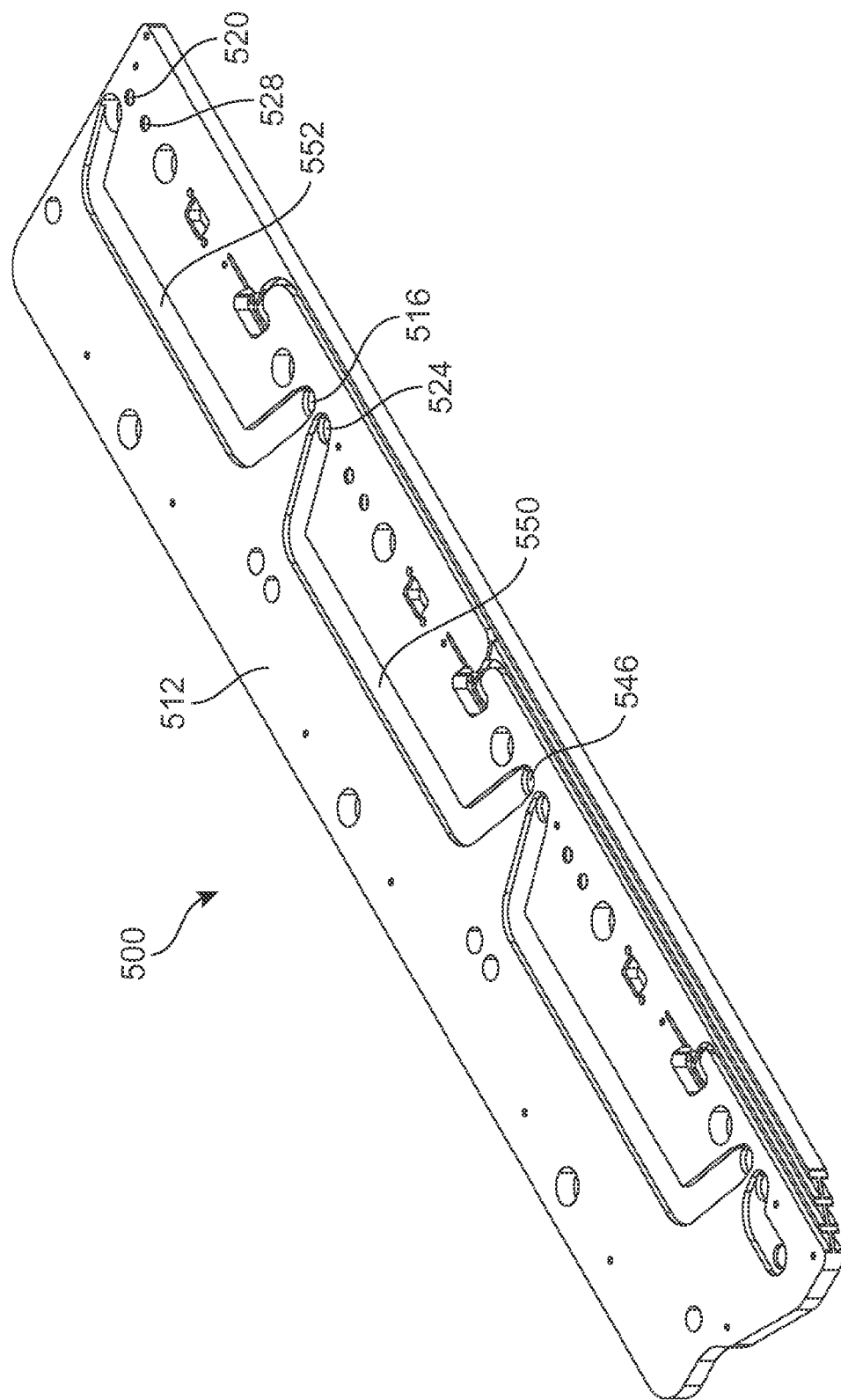
FIG. 13 is an isometric view of a second side of the backbone of FIG. 7, in accordance with an exemplary embodiment.
Figure 14:
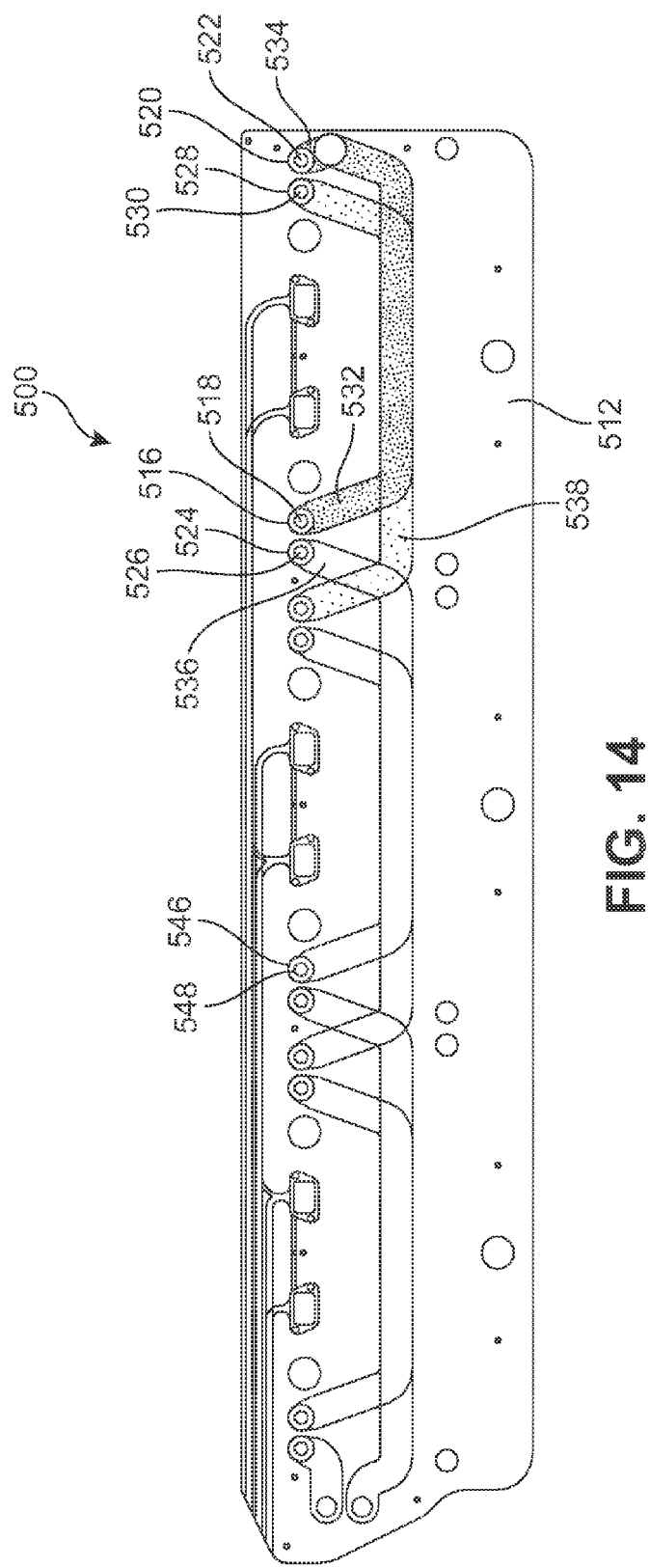
FIG. 14 is a schematic view of a side of a backbone, in accordance with an exemplary embodiment.
Figures 17, 18:
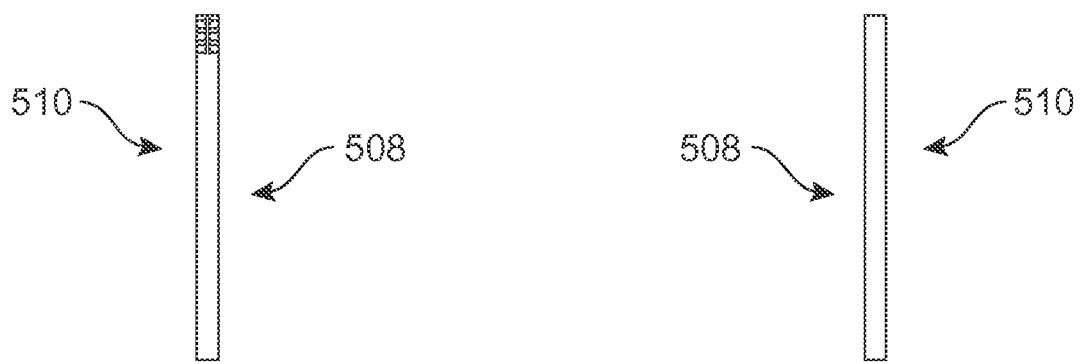
FIG. 17 is a schematic view of a left edge of the backbone of FIG. 14, in accordance with an exemplary embodiment.
FIG. 18 is a schematic view of a right edge of the backbone of FIG. 14, in accordance with an exemplary embodiment.

In some embodiments, the backbone system 500 includes a bus bar system for electronically connecting battery modules (e.g., 408). For example, as shown in FIG. 10, the backbone system 500 includes a bus bar system 502. The bus bar system may include any number of bus bars. For example, as shown in FIGS. 13-14 the bus bar system 502 may include eight bus bars. In other embodiments, the bus bar system 502 includes fewer bus bars (e.g., 2, 3, 4, etc.) and more bus bars (e.g., 9, 10, 11, etc.).

In various embodiments, the backbone system includes a first panel for electronically insulating the bus bar system. For example, as shown in FIG. 10, the backbone system 500 includes a first panel 512. In some embodiments, the first panel 512 is an electric insulator. In such embodiments, the first panel may electronically insulates one or more portions of the bus bar system. In various embodiments, the first panel includes one or more through holes. For example, the first panel 512 may include a through hole for a signal connector, a guide pin, a coupling element, a bolt, and the like. In some embodiments, the first panel includes one or more blind holes. For example, the first panel 512 may include a blind hole for a routing a signal cable.

In some embodiments, the backbone system includes a second panel for electronically insulating the bus bar system. For example, as shown in FIG. 10, the backbone system 500 includes a second panel 506. In some embodiments, the second panel 506 is an electric insulator. In such embodiments, the second panel may electronically insulate the bus bar system. In various embodiments, the third panel includes one or more through holes. For example, the second panel 506 may include a through hole for a signal connector, a guide pin, a coupling element, a bolt, and the like. In some embodiments, the second panel includes one or more blind holes. For example, the second panel 506 may include a blind hole for a routing a signal cable. Moreover, in varying embodiments, the second panel has one or more grooves for coupling with a housing. For example, the second panel 506 includes a groove (not shown). In other embodiments, the second panel omits the grooves for coupling with a housing. For example, the second panel 506 has an outer surface that is substantially planar (see FIGS. 25-26).

In some embodiments, the backbone system includes a third panel for electronically insulating the bus bar system. For example, as shown in FIG. 10, the backbone system 500 includes a third panel 504. In some embodiments, the third panel 504 is an electric insulator. In such embodiments, the third panel may electronically insulate the bus bar system. In various embodiments, the third panel includes one or more through holes. For example, the third panel 504 may include a through hole for a signal connector, a guide pin, a coupling element, a bolt, and the like. In some embodiments, the third panel includes one or more blind holes. For example, the third panel 504 may include a blind hole for a routing a signal cable. Moreover, in varying embodiments, the third panel has one or more grooves for coupling with a housing. For example, the third panel 504 includes a groove 544. In other embodiments, the third panel omits the grooves for coupling with a housing. For example, the third panel 504 has an outer surface that is substantially planar (see FIGS. 25-26).

In various embodiments, the first panel and the second panel substantially encapsulate the bus bar system and/or one or more bus bars of the bus bar system. As used herein, an object is substantially encapsulated when at least eighty percent of a surface area of the object is covered. For example, as shown in FIGS. 13-14, the first panel 512 and the second panel 506 substantially encapsulate the first bus bar 536 when the first panel 512 and the second panel 506 cover first bus bar 536 (See FIGS. 13-14). Similarly, in some embodiments, the first panel and the third panel substantially encapsulate the bus bar system and/or one or more bus bars of the bus bar system. For example, as shown in FIGS. 13-14, the first panel 512 and the third panel 504 substantially encapsulate the second back bus bar 538 when the first panel 512 and the third panel 504 cover more than eighty percent of a surface area of the second back bus bar 538. Further, in certain embodiments, the second panel and the third panel substantially encapsulate the bus bar system. For example, as shown, the second panel 506 and the third panel 504 substantially encapsulate the bus bar system 502 by covering more than eighty percent of a surface area of bus bars of the bus bar system 502.

In one embodiment, the second panel and the third panel are on opposite sides of the bus bar system. For example, as shown, the second panel 506 is on a first upper surface 510 of the bus bar system 502. Similarly, the third panel 504 is on a first lower surface 508 of the bus bar system 502. In the example, the first lower surface 508 and the first upper surface 510 are on opposite sides of the bus bar system 502. As used herein, opposite sides are sides that face in substantially opposing directions. For example, the first lower surface 508 faces in one direction along the axis 514 and the first upper surface 510 faces in the other direction along the axis 514. Similarly, the first panel and the second panel may be on opposite sides of the third panel. For example, as shown, the third panel 504 is on the first lower surface 508 of the first panel 512. In another example, as shown, the second panel 506 is on the first upper surface 510 of the first panel 512.

Figure 11:
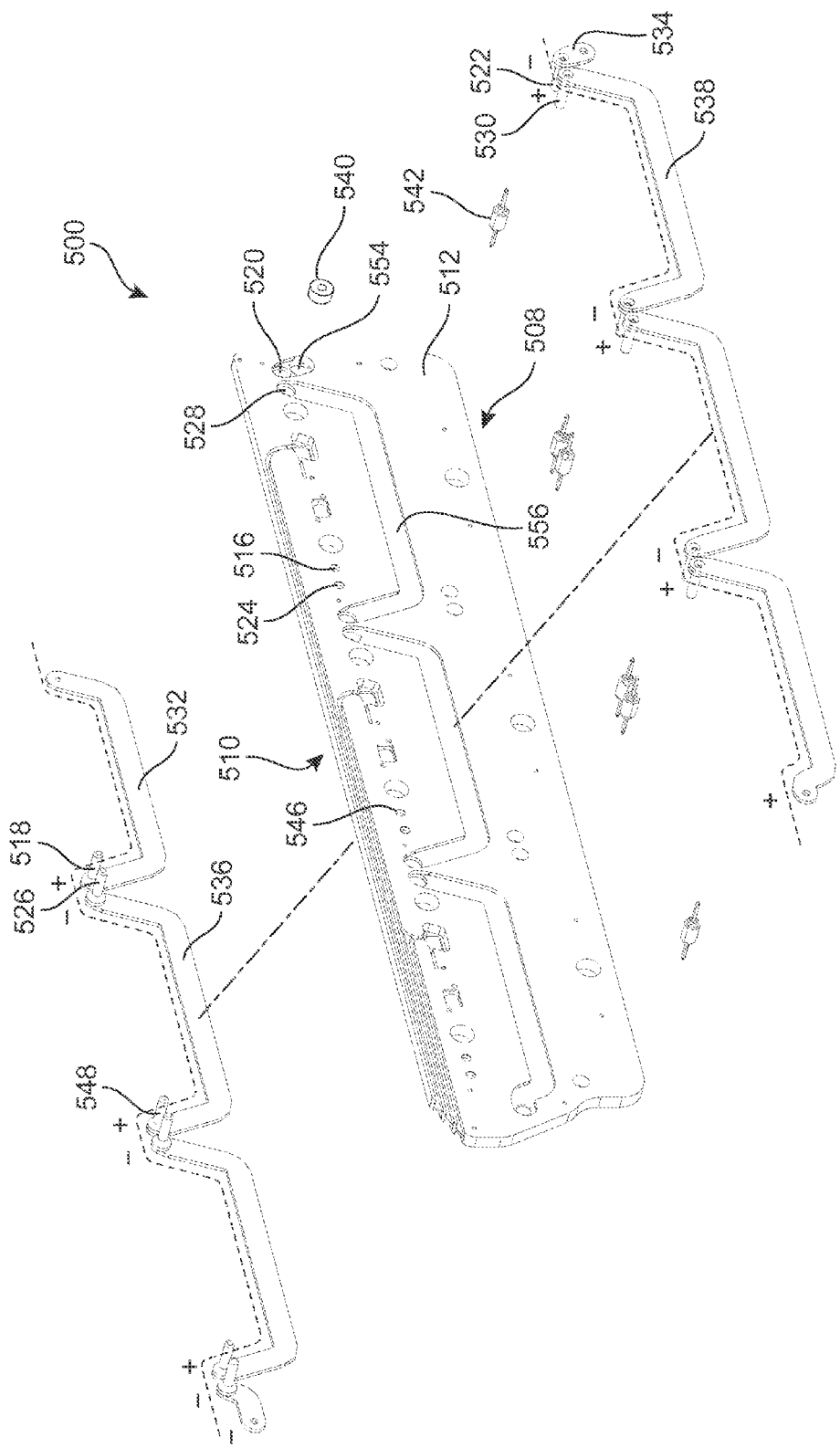
FIG. 11 is a second exploded view of the backbone of FIG. 10, in accordance with an exemplary embodiment.

In certain embodiments, the backbone system includes a guide pin for facilitating a connection with a battery module. For example, as shown in FIG. 11, the backbone system 500 includes a guide pin 542. The backbone system 500 may include any number of guide pins, and, in some embodiments, the guide pin 542 may be representative of other guide pins of the backbone system 500. In certain embodiments, the guide pin is inserted through the first panel. For example, as shown in FIG. 11, the guide pin 542 is inserted through the first panel 512. Similarly, in varying embodiments, the guide pin is inserted through the second panel and/or the third panel. For example, the guide pin 542 may be inserted through the second panel 506 and/or through the third panel 504. Moreover, in some embodiments, the guide pin extends away from the second panel and/or the guide pin extends away from the third panel. For example, the guide pin 542 may extend away from the second panel 506. In another example, the guide pin 542 may extend away from the third panel 504. Accordingly, the guide pin may extend into a bay to facilitate a connection with a battery module (see FIGS. 22-23).

In various embodiments, the first panel includes a first socket to facilitate an attachment of a first coupling element. For example, as shown in FIG. 11, the first panel 512 of the backbone system 500 includes a first socket 524 for a first coupling element 526. The first socket 524 and the first coupling element 526 may have a substantially equal size and/or shape to position the first coupling element 526 on the first panel 512 for a connection.

In some embodiments, the first panel includes a second socket to facilitate an attachment of a second coupling element. For example, as shown in FIG. 11, the first panel 512 includes a second socket 546 for a second coupling element 548. The second socket 546 and the second coupling element 548 may have a substantially equal size and/or shape to position the second coupling element 548 on the first panel 512 for a connection.

In certain embodiments, the first panel includes a third socket to facilitate an attachment of a third coupling element. For example, as shown in FIG. 11, the first panel 512 includes a third socket 516 for a third coupling element 518. The third socket 516 and the third coupling element 518 may have a substantially equal size and/or shape to position the third coupling element 518 on the first panel 512 for a connection.

In some embodiments, the first panel includes a first back socket to facilitate an attachment of a first back coupling element. For example, as shown in FIG. 11, the first panel 512 includes a first back socket 520 for a first back coupling element 522. The first back socket 520 and the first back coupling element 522 may have a substantially equal size and/or shape to position the first back coupling element 522 on the first panel 512 for a connection.

In some embodiments, the first panel includes a second back socket to facilitate an attachment of a second back coupling element. For example, as shown in FIG. 11, the first panel 512 includes a second back socket 528 for a second back coupling element 530. The second back socket 528 and the second back coupling element 530 may have a substantially equal size and/or shape to position the second back coupling element 530 on the first panel 512 for a connection.

In various embodiments, the bus bar system includes a first bus bar. For example, as shown in FIG. 11, the bus bar system 502 includes a first bus bar 536. In certain embodiments, the first bus bar may be positioned between the first panel and the second panel. For example, as shown in FIGS. 10-11, the first bus bar 536 may be positioned between the first panel 512 and the second panel 506. Moreover, in some embodiments, the first bus bar is electronically coupled to the first coupling element. For example, as shown, the first bus bar 536 is mechanically attached to the first coupling element 526. Further, in some embodiments, the first bus bar is electronically coupled to the second coupling element. For example, as shown, the first bus bar 536 is mechanically attached to the second coupling element 548.

In certain embodiments, the first panel includes a first cavity for the first bus bar. For example, as shown in FIG. 13, the first panel 512 includes a first cavity 550 for the first bus bar 536. In some embodiments, the first cavity 550 is similar to the first cavity 114 of FIG. 1. For example, the first bus bar 536 may be positioned tightly into the first cavity 550 to ensure a position on the first panel 512 for a connection with a battery module. In other embodiments, the first cavity 550 and the first cavity 114 are different.

In some embodiments, the bus bar system includes a second bus bar. For example, as shown in FIG. 11, the bus bar system 502 includes a second bus bar 532. In certain embodiments, the second bus bar may be positioned between the first panel and the second panel. For example, as shown in FIGS. 10-11, the second bus bar 532 may be positioned between the first panel 512 and the second panel 506. Moreover, in some embodiments, the second bus bar is electronically coupled to the second coupling element. For example, as shown, the second bus bar 532 is mechanically attached to the third coupling element 518. Further, in some embodiments, the second bus bar is mechanically separated from the first bus bar. For example, as shown, the second bus bar 532 is spaced from the first bus bar 536.

Figure 12:
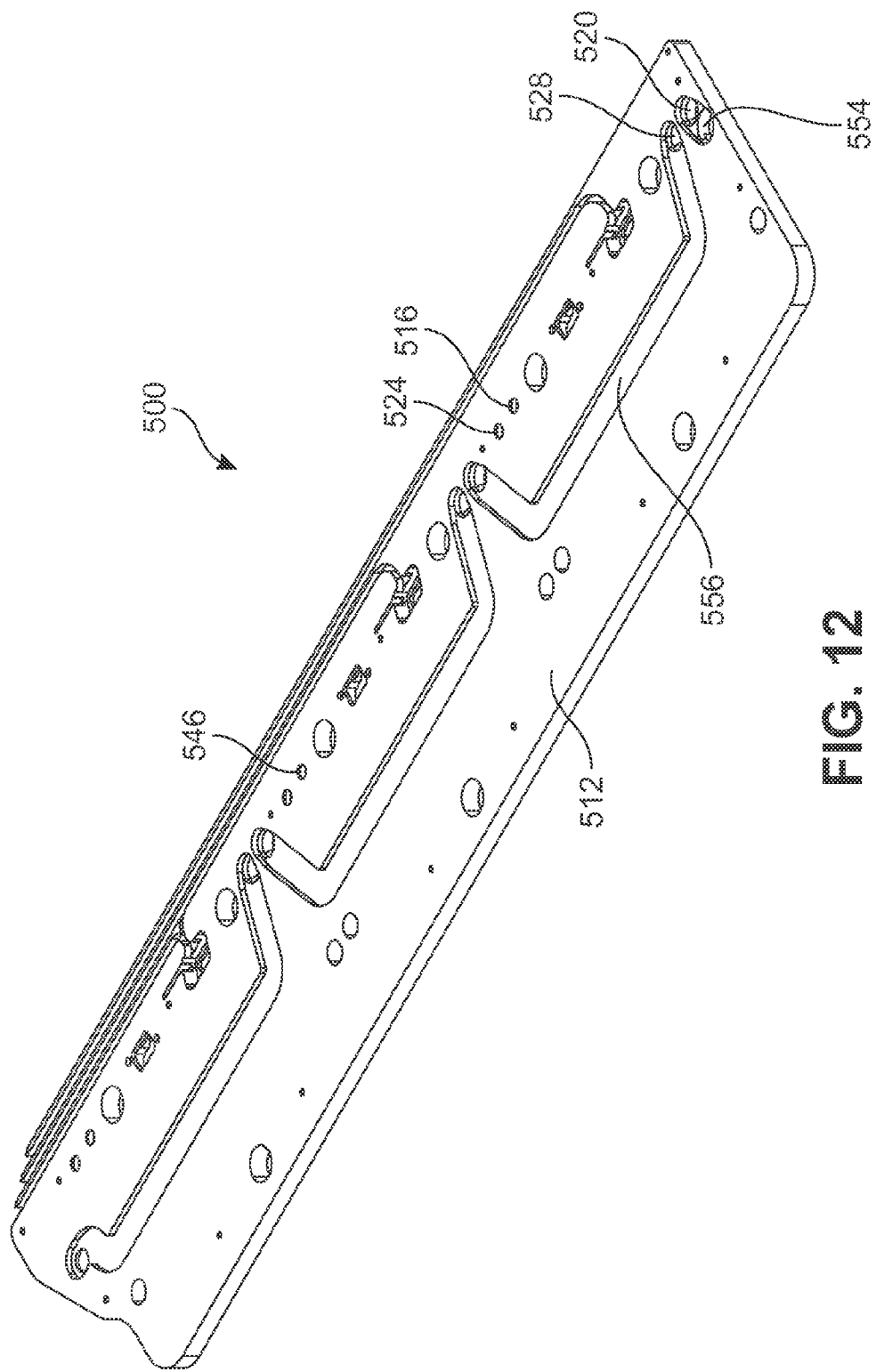
FIG. 12 is an isometric view of a first side of a backbone, in accordance with an exemplary embodiment.

In certain embodiments, the first panel includes a second cavity for the second bus bar. For example, as shown in FIG. 13, the first panel 512 includes a second cavity 552 for the second bus bar 532. In some embodiments, the second cavity 552 is similar to the second cavity 118 of FIG. 1. For example, the second bus bar 532 may be positioned tightly into the second cavity 552 to ensure a position on the first panel 512 for a connection with a battery module. In other embodiments, the second cavity 552 and the second cavity 118 are different. Moreover, in some embodiments, the first cavity is spaced from the second cavity. For example, as shown in FIG. 12, the first cavity 550 is spaced from the second cavity 552 such that the first bus bar 536 and the second bus bar 532 are prevented from physically contacting.

In various embodiments, the bus bar system includes a first back bus bar. For example, as shown in FIG. 11, the bus bar system 502 includes a first back bus bar 534. In certain embodiments, the first back bus bar may be positioned between the first panel and the third panel. For example, as shown in FIGS. 10-11, the first back bus bar 534 may be positioned between the first panel 512 and the third panel 504. Moreover, in some embodiments, the first back bus bar is electronically coupled to the first back coupling element. For example, as shown, the first back bus bar 534 is mechanically attached to the first back coupling element 522. Further, in some embodiments, the first back bus bar is mechanically separated from the first bus bar and the second bus bar. For example, as shown, the first back bus bar 534 is spaced from the first bus bar 536 and the second bus bar 532.

In certain embodiments, the first panel includes a first back cavity for the first back bus bar. For example, as shown in FIG. 11, the first panel 512 includes a first back cavity 554 for the first back bus bar 534. In some embodiments, the first back cavity 554 is similar to the first cavity 114 of FIG. 1. For example, the first back bus bar 534 may be positioned tightly into the first back cavity 554 to ensure a position on the first panel 512 for a connection with a battery module. In other embodiments, the first back cavity 554 and the first cavity 114 are different. For example, the first back cavity 554 and the first cavity 114 may have a different size and/or shape. Moreover, in some embodiments, the first back cavity is spaced from the first cavity and/or the second cavity. For example, as shown in FIGS. 11-12, the first back cavity 554 is spaced from the first cavity 550 and second cavity 552 such that the first back bus bar 534 is prevented from physically contacting the first bus bar 536 and the second bus bar 532.

In some embodiments, the bus bar system includes a second back bus bar. For example, as shown in FIG. 11, the bus bar system 502 includes a second back bus bar 538. In certain embodiments, the second back bus bar may be positioned between the first panel and the third panel. For example, as shown in FIGS. 10-11, the second back bus bar 538 may be positioned between the first panel 512 and the third panel 504. Moreover, in some embodiments, the second back bus bar is electronically coupled to the second back coupling element. For example, as shown, the second back bus bar 538 is mechanically attached to the second back coupling element 530. Further, in some embodiments, the second back bus bar is mechanically separated from the first bus bar, the second bus bar, and the first back bus bar. For example, as shown, the second back bus bar 538 is spaced from the first bus bar 536, the second bus bar 532, and the first back bus bar 534.

In certain embodiments, the first panel includes a second back cavity for the second back bus bar. For example, as shown in FIG. 11, the first panel 512 includes a second back cavity 556 for the second back bus bar 538. In some embodiments, the second back cavity 556 is similar to the second cavity 118 of FIG. 1. For example, the second back bus bar 538 may be positioned tightly into the second back cavity 556 to ensure a position for a connection with a battery module. In other embodiments, the second back cavity 556 and the second cavity 119 are different. Moreover, in some embodiments, the second back cavity is spaced from one or more of the first back cavity, the first cavity and the second cavity. For example, as shown in FIGS. 11-12, the second back cavity 554 is spaced from the first back cavity 554, the first cavity 550, and second cavity 552 such that the second back bus bar 538 is prevented from physically contacting first back bus bar 534, the first bus bar 536, and the second bus bar 532.

In some instances, a link may be used to connect one side of bus bars with another side of bus bars. For example, a link 540 may mechanically and electronically couple with the second bus bar 532. Similarly, the link 540 may mechanically and electronically couple with the first back bus bar 534. Moreover, as shown in FIG. 11, the link may be positioned within a hole extending from a first lower surface to a first upper surface. The hole may, in some embodiments, position the link 540 on the first panel 512. In some embodiments, the second cavity positions the second bus bar to align with the link. For example, the second cavity 552 positions the second bus bar 532 to align with the link 540. In certain embodiments, the first back cavity 554 positions the first back bus bar 534 to align with the link 540.

Figure 19:
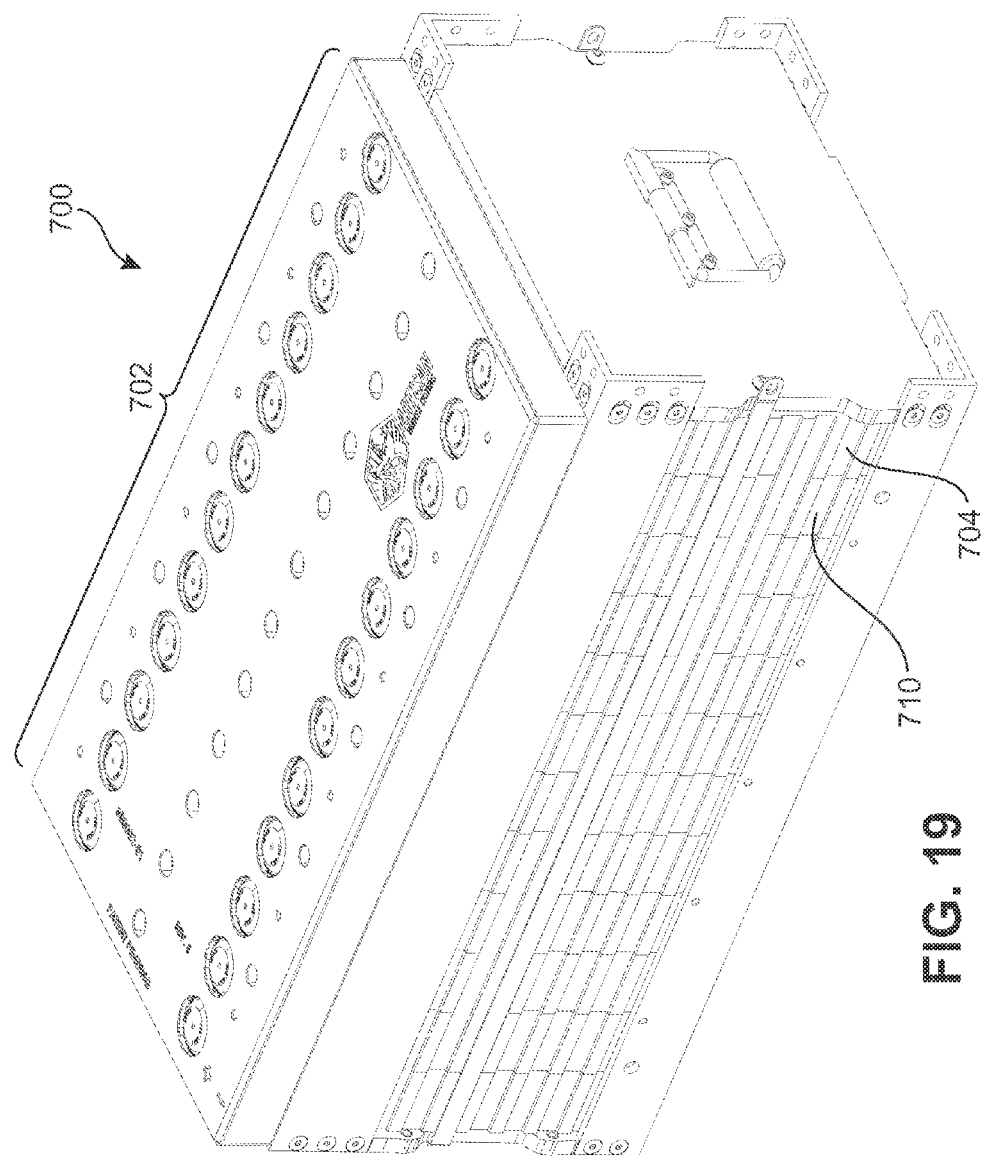
FIG. 19 is an isometric view of a first side of a battery module, in accordance with an exemplary embodiment.
Figure 20:
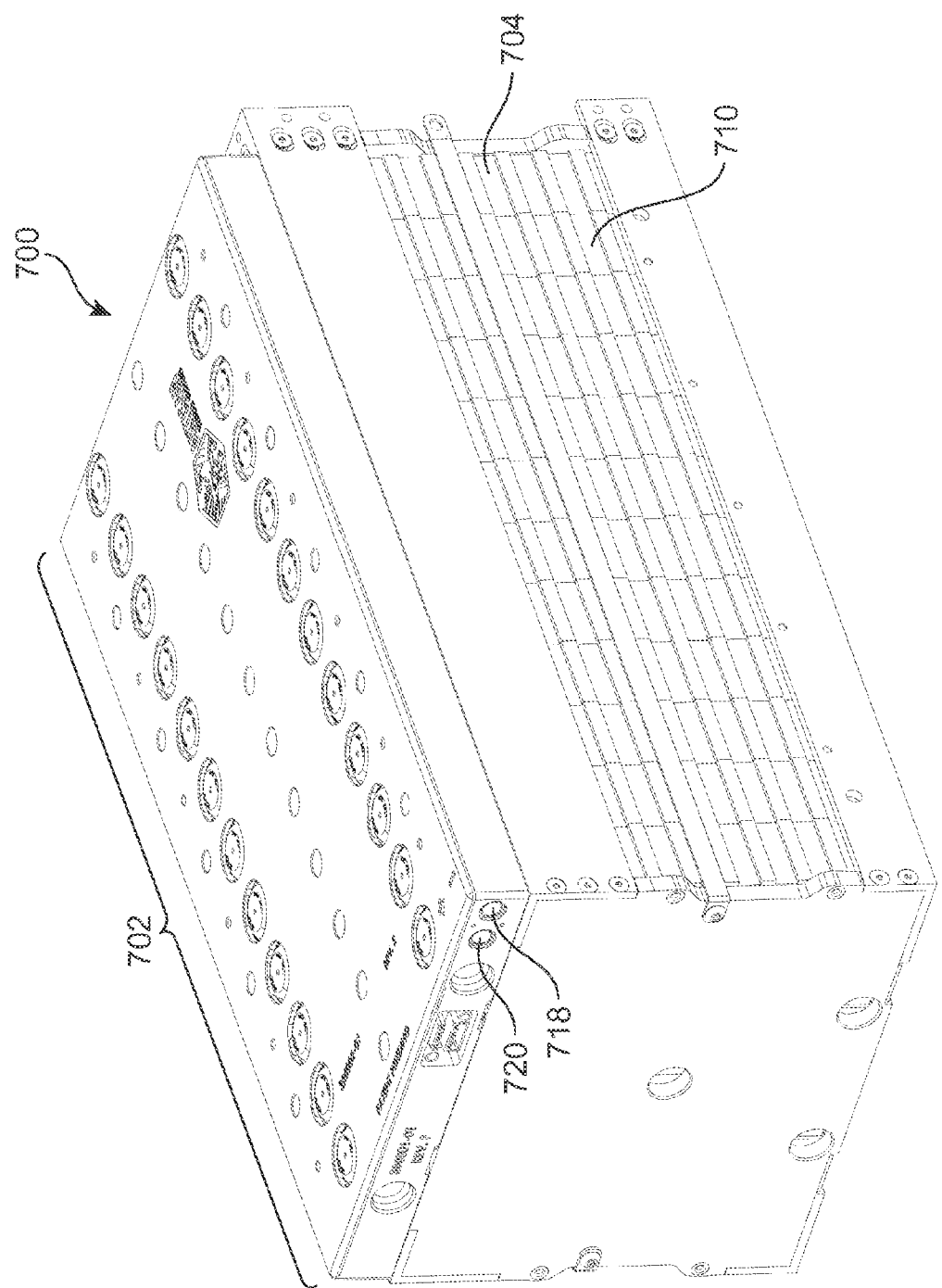
FIG. 20 is an isometric view of a second side of the battery module of FIG. 19, in accordance with an exemplary embodiment.
Figure 21:
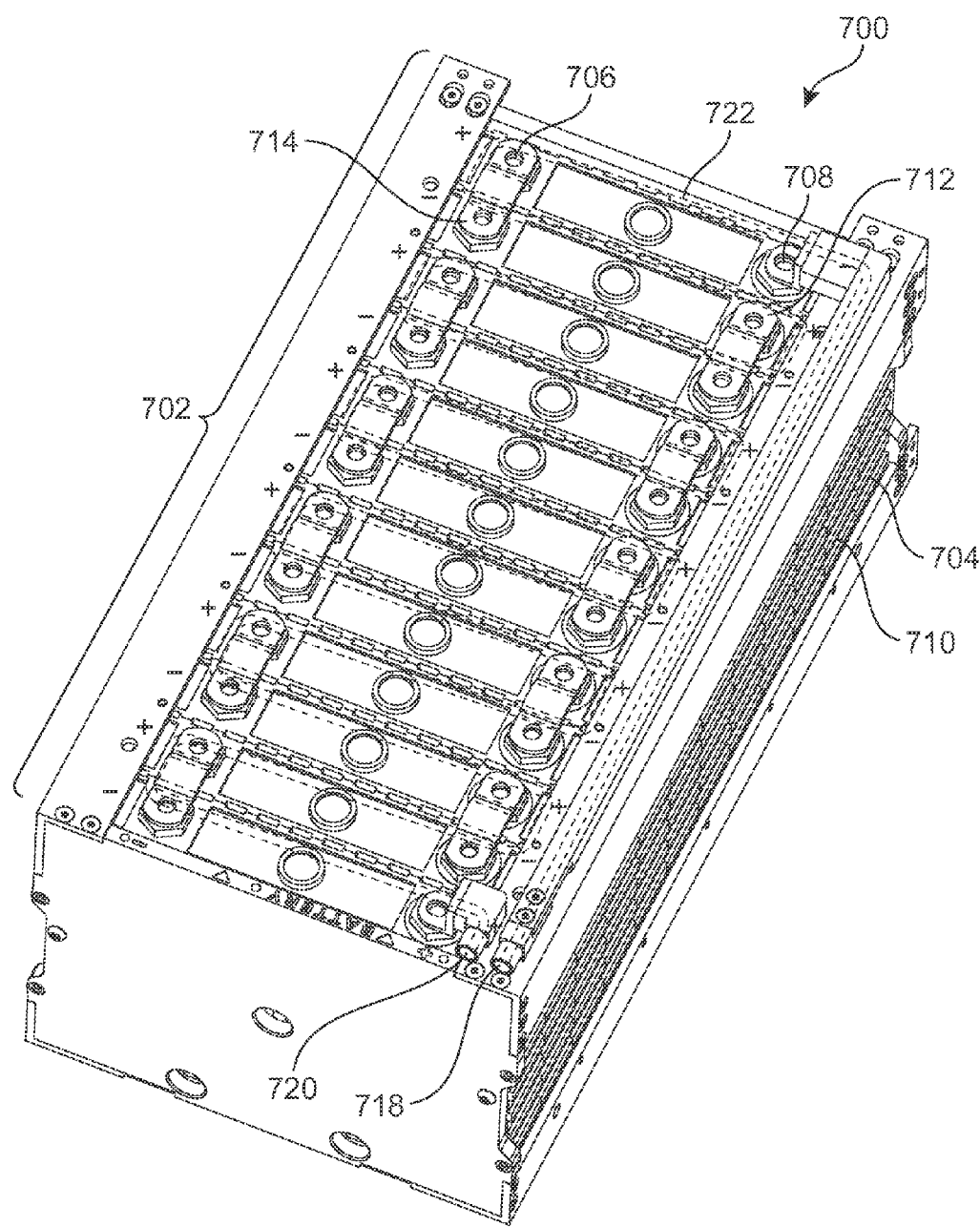
FIG. 21 is a schematic view the battery module of FIG. 19, in accordance with an exemplary embodiment.

In various instances, a battery system utilizes a battery module having a set of batteries to allow simplified replacement of a battery cell of the battery system. A set of batteries can include any type and number of batteries. For example, as shown in FIGS. 19-21, the battery module 700 includes a set 702 of twelve battery cells. In other embodiments, the set includes less than nine battery cells (e.g., 2, 3, 6, etc.) and more than nine batteries (e.g., 10, 11, 12, etc.). As used herein, a battery cell may include any number of sub-cells using various connection schemes. For example, a battery cell may include any number of sub-cells connected in series and/or any number of sub-cells connected in parallel.

In some embodiments, the set of batteries includes a first battery cell. For example, the set 702 includes a first battery cell 704. The first battery cell may include any device that can store energy, particularly devices that convert stored chemical energy into electrical energy. Examples of a battery cell include capacitors, ultra-capacitors, and electrochemical cells. Examples of electrochemical cells include primary (e.g., single use) and secondary (e.g., rechargeable).

Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. The first battery cell may have various voltage levels. For example, the first battery cell 704 may have a voltage of less than 40 volts, less than 20 volts, less than 10 volts, less than 5 volts, 3.3 volts, less than 3.3 volts, etc. Similarly, the first battery cell may have various energy capacity levels. For example, the first battery 704 may have a capacity of 13 ampere-hour, more than 10 ampere-hour, more than 20 ampere-hour, more than 25 ampere-hour, etc.

In certain embodiments, the battery module includes a first terminal to couple with a coupling element. For example, as shown in FIG. 20, the battery module 700 includes a first terminal 718 (e.g., positive) to couple with a first coupling element. Similarly, in some embodiments the battery module includes a second terminal to couple with a coupling element. For example, as shown in FIG. 20, the battery module 700 includes a second terminal 720 (e.g., negative) to couple with a second coupling element.

In some embodiments, a first battery cell of the set of battery cells includes a first terminal and a second terminal. For example, as shown in FIG. 21, the first battery cell 704 of the set 702 includes a first battery 706 (e.g., positive) and a second terminal 708 (e.g., negative). Similarly, in certain embodiments, a second battery cell of the set of batteries includes a third terminal (e.g., positive) and a fourth terminal (e.g., negative). For example, as shown in FIG. 21, the second battery cell 710 of the set 702 includes a third terminal 712 and a fourth terminal 714.

In certain embodiments, the set of battery cells is serially connected to increase a voltage across the first terminal and the second terminal. For example, as shown in FIG. 21, the connection path 722 extends from a negative side to a high side of each battery cell of the set 702. In the example, one side of the connection path 722 is connected to the first terminal 718 and the other side of the connection path 722 is connected to the second terminal 720. Moreover, in various embodiments, the set 702 is serially connected to output 40 volts across the first terminal and the second terminal. For example, each battery cell of the set 702 has a voltage of 3.3 volts. Accordingly, in the example, the serial connection of the set 702, results in a voltage of approximately 40 volts across the first terminal 718 and the second terminal 720.

Figure 22:
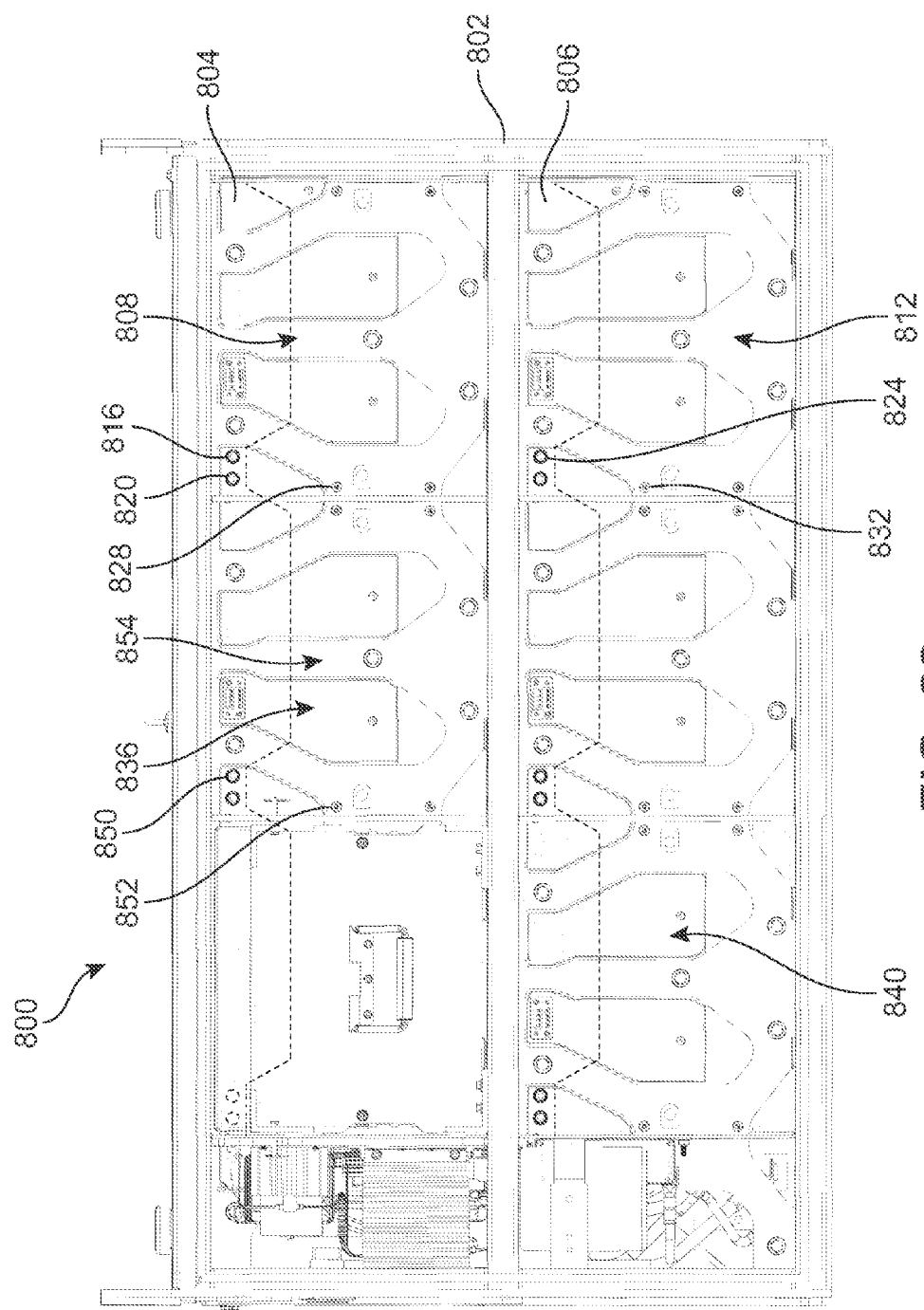
FIG. 22 is an schematic view of a first side of a battery system, in accordance with an exemplary embodiment.

FIG. 22 illustrates a battery system, in accordance with an exemplary embodiment. In some embodiments, the battery system 800 is similar to the battery system 400 of FIGS. 8-11. For example, the battery system may accommodate twelve battery modules. In other embodiments, the battery system 800 is different than the battery system 400.

In one embodiment, the battery system includes a housing. For example, as shown in FIG. 22, the battery system 800 includes a housing 802. The housing may be formed of various materials, for example, steel, aluminum, etc.

In some embodiments, the housing supports an upper backbone. For example, as shown in FIG. 22, the housing 802 supports an upper backbone 804. In some embodiments, the upper backbone 804 is similar to one or more of the backbone system 416 of FIG. 9, the backbone system 100 of FIGS. 1-5, and the backbone system 500 of FIGS. 10-18. For example, the upper backbone 804 may be configured for the battery module 408. In other embodiments, the upper backbone 804 is different than one or more of the backbone system 416, the backbone system 100, and the backbone system 500.

In various embodiments, the housing supports a lower backbone. For example, as shown in FIG. 22, the housing 802 supports a lower backbone 806. In some embodiments, the lower backbone 806 is similar to one or more of the backbone system 416 of FIG. 9, the backbone system 100 of FIGS. 1-5, and the backbone system 500 of FIGS. 13-21. For example, the lower backbone 806 may be configured for the battery module 408. In other embodiments, the lower backbone 806 is different than one or more of the backbone system 416, the backbone system 100, and the backbone system 500.

Figure 23:
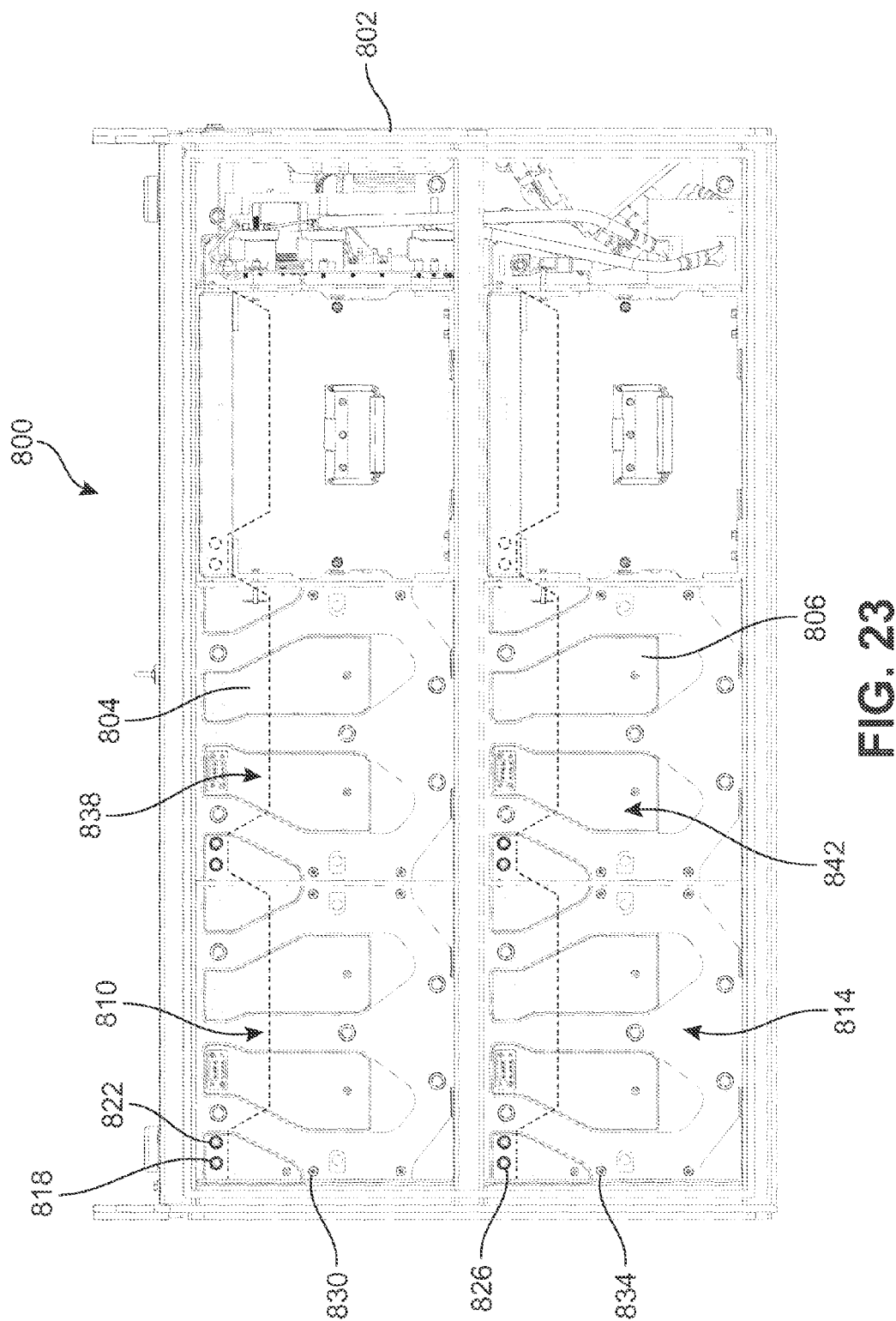
FIG. 23 is a schematic view of a second side of the battery system of FIG. 14, in accordance with an exemplary embodiment.

In certain embodiments, the housing includes any number of bays to facilitate a connection of the upper backbone with any number of modules. For example, as shown in FIG. 22, the housing 802 includes a first bay 808 for connections with the upper backbone 804. Similarly, in some embodiments, the housing may include a second bay. For example, as shown in FIG. 22, the housing 802 includes a second bay 854 for connections with the upper backbone 804. In some embodiments, the housing includes a first back bay. For example, as shown in FIG. 23, the housing 802 includes a first back bay 810 for connections with the upper backbone 804. Similarly, the housing may include a second back bay.

In some embodiments, the housing includes any number of bays to facilitate a connection with any number of backbones of the battery system. For example, as shown in FIG. 22, the housing 802 includes a first lower bay 812 for connections with the lower backbone 806. Similarly, in some embodiments, the housing may include a first lower back bay. For example, as shown in FIG. 23, the housing 802 includes a first lower back bay 814 for connections with the lower backbone 806.

In some embodiments, one or more of the first bay, the second bay, the first back bay, second back bay, first lower bay, and the first lower back bay may be similar. For example, the first bay 808, the second bay 854, the first back bay 810, the first lower bay 812, and the first lower back bay 814 may have similar physical dimensions such as height, width, and depth. In other embodiments, one or more of the first bay, the second bay, the third bay, and the fourth bay are different.

In various embodiments, the first bay and the first back bay are on opposite sides of the upper backbone. For example, as shown in FIGS. 22-23, the first bay 808 and the first back bay 810 are on opposite sides of the upper backbone 804. In one embodiment, the first bay is on a first side of the upper backbone. For example, as shown in FIG. 22, the first bay 808 is on a first side 836 of the upper backbone 804. In some embodiments, the second bay is on a second side of the upper backbone. For example, as shown in FIG. 23, the first back bay 810 is on a second side 838 of the upper backbone 804. In various embodiments, the first side and the second side are on opposite sides of the upper backbone. For example, as shown in FIGS. 22-23, the first side 836 and the second side 838 are on opposite sides of the upper backbone 804.

Similarly, in some embodiments, the first lower bay and the first lower back bay are on opposite sides of the lower backbone. For example, as shown in FIGS. 22-23, the first lower bay 812 and the first lower back bay 814 are on opposite sides of the lower backbone 806. In one embodiment, the first lower bay is on a third side of the lower backbone. For example, as shown in FIG. 22, the first lower bay 812 is on a third side 840 of the lower backbone 806. In some embodiments, the first lower back bay is on a fourth side of the lower backbone. For example, as shown in FIG. 23, the first lower back bay 814 is on a fourth side 842 of the lower backbone 806. In various embodiments, the third side and the fourth side are on opposite sides of the lower backbone. For example, as shown in FIGS. 22-23, the third side 840 and the fourth side 842 are on opposite sides of the lower backbone 806.

In various embodiments, the first side and the third side are substantially aligned. For example, as shown in FIG. 22, the first side 836 and the second side 838 are substantially aligned. In one embodiment, sides are substantially aligned when a plane formed by a surface of the one side and a plane formed by the other side are parallel. In some embodiments, sides are substantially aligned when a plane formed by a surface of the one side and a plane formed by the other side are parallel and are separated by a distance of less than a thickness of either the plane. Similarly, in certain embodiments, the second side and the fourth side are substantially aligned. For example, as shown in FIG. 23, the second side 838 and the fourth side 842 are substantially aligned.

In certain embodiments, the upper backbone includes a first coupling element. For example, as shown in FIG. 22, the upper backbone 804 includes a first coupling element 820. In one embodiment, the first coupling element 820 is coupled to a first bus bar (e.g., first bus bar 536 of FIG. 11) of the upper backbone 804 (not shown). Similarly, in some embodiments, the upper backbone includes a second coupling element. For example, as shown in FIG. 22, the upper backbone 804 includes a second coupling element 850. In various embodiments, the upper backbone includes a third coupling element. For example, as shown in FIG. 22, the upper backbone 804 includes a third coupling element 816. In one embodiment, the third coupling element 816 is coupled to a second bus bar (e.g., second bus bar 532 of FIG. 11) of the upper backbone 804 (not shown).

In certain embodiments, the upper backbone includes a first back coupling element. For example, as shown in FIG. 23, the upper backbone 804 includes a first back coupling element 818. In one embodiment, the first back coupling element 818 is coupled to a first back bus bar (e.g., first back bus bar 534 of FIG. 11) of the upper backbone 804 (not shown). In some embodiments, the upper backbone includes a second back coupling element. For example, as shown in FIG. 23, the upper backbone 804 includes a second back coupling element 822. In one embodiment, the second back coupling element 822 is coupled to a second back bus bar (e.g., second back bus bar 538 of FIG. 11) of the upper backbone 804 (not shown).

In various embodiments, the lower backbone includes coupling elements substantially similar to the upper backbone. For example, as shown in FIG. 22, the lower backbone 806 includes a first lower coupling element 824. In another example, as shown in FIG. 23, the lower backbone 806 includes a first lower back coupling element 826. In other embodiments, the lower backbone and the upper backbone are different.

In certain embodiments, the first bay includes a first guide pin. For example, as shown in FIG. 22, the first bay 808 includes a first guide pin 828. In some embodiments, the first guide pin is configured to guide each of a plurality of battery modules into the first bay. For example, the first guide pin 828 may be positioned vertically and horizontally within the first bay 808 to align with the plurality of battery modules. Similarly, in various embodiments, the second bay includes a second guide pin. For example, as shown in FIG. 22, the second bay 854 includes a second guide pin 852. In some embodiments, the second guide pin is configured to guide each of the plurality of battery modules into the second bay. For example, the second guide pin 852 may be positioned vertically and horizontally within the second bay 854 to align with the plurality of battery modules.

In some embodiments, the first back bay includes a first back guide pin. For example, as shown in FIG. 23, the first back bay 810 includes a first back guide pin 830. In some embodiments, the first back guide pin is configured to guide each of the plurality of battery modules into the first back bay. For example, the first back guide pin 830 may be positioned vertically and horizontally within the first back bay 810 to align a coupling element with a terminal of a battery module of the plurality of battery modules.

In some embodiments, the first lower bay includes a first lower guide pin. For example, as shown in FIG. 22, the first lower bay 812 includes a first lower guide pin 832. In some embodiments, the first lower guide pin is configured to guide each of the plurality of battery modules into the first lower bay. For example, the first lower guide pin 832 may be positioned vertically and horizontally within the first lower bay 812 to align a coupling element with a terminal of a battery module of the plurality of battery modules. Similarly, in various embodiments, the first lower back bay includes a first lower back guide pin. For example, as shown in FIG. 23, the first lower back bay 814 includes a first lower back guide pin 834. In some embodiments, the first lower back guide pin is configured to guide each of the plurality of battery modules into the first lower back bay. For example, the first lower back guide pin 834 may be positioned vertically and horizontally within the first lower back bay 814 to align with the plurality of battery modules.

Figure 24:
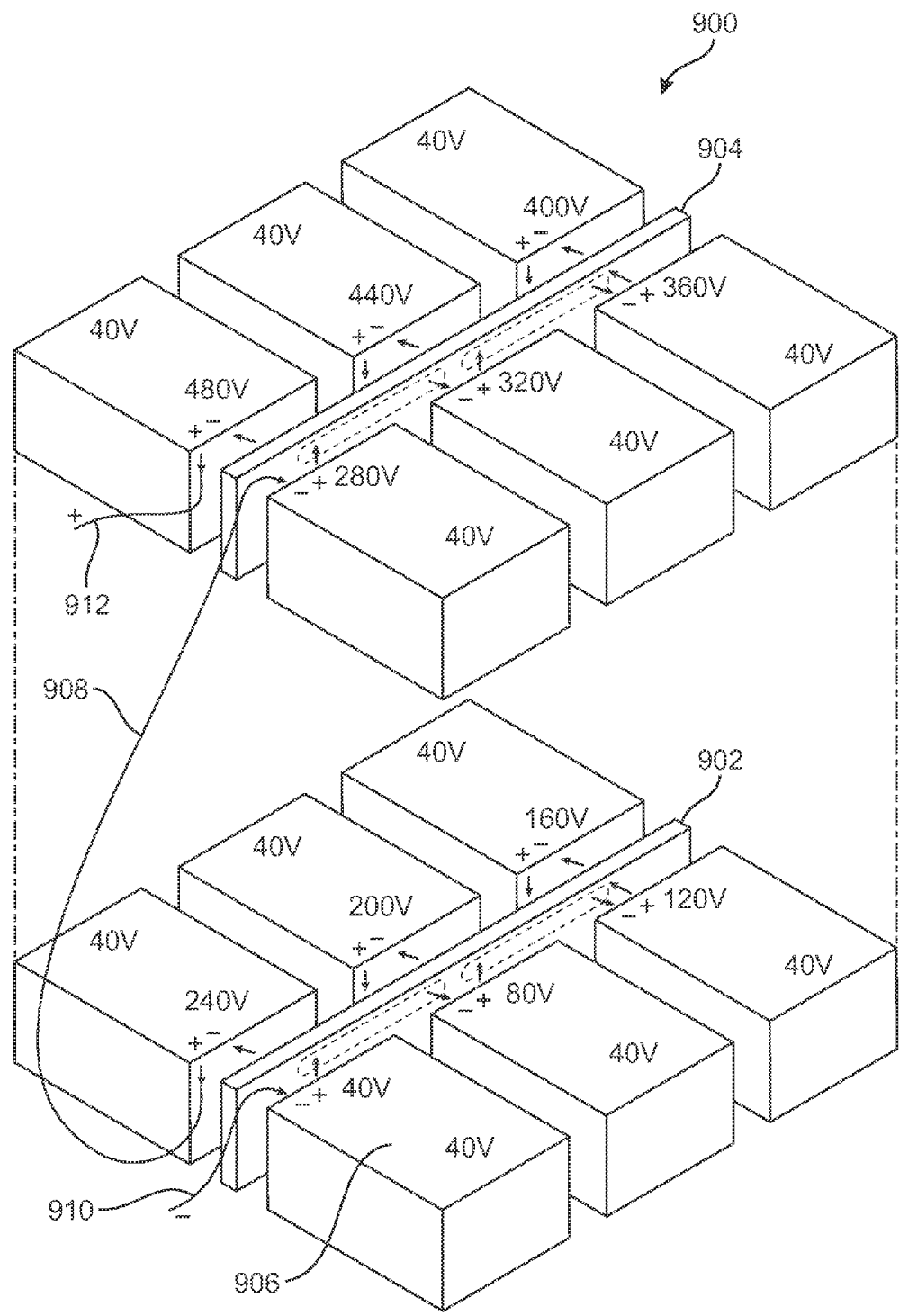
FIG. 24 is a schematic view of a battery system, in accordance with an exemplary embodiment.

In some instances, a backbone system may facilitate a connection of battery modules for increasing a voltage of a battery system. For example, as shown in FIG. 24, the battery system 900 includes a lower backbone 902 and an upper backbone 904. An electrical series connection path 908 indicates a connection to battery module 906 that allows twelve 40 volt batteries to output 480 volts across the negative system terminal 910 and the positive system terminal 912. In other embodiments, the battery system 900 may be configured for any output voltage level, any battery cell type (e.g., voltage), any number of backbones (e.g., 1, 3, 4, etc.), and the like. Accordingly, the battery system 900 may facilitate a connection of battery module 906 for increasing a voltage of a battery system 900 by using an electrical series connection path 908.

In various embodiments, the lower backbone 902 and/or the upper backbone 904 can allow connection with any number of modules (e.g., see FIGS. 31-34). As shown, the lower backbone 902 may connect six battery modules including the battery module 906. Similarly, as shown, the upper backbone 904 may connect six battery modules. Further, in the example, the battery module 906 is exemplary to the battery modules connected to the lower backbone 902 and the upper backbone 904. In other embodiments, the lower backbone 902 connects one or more battery modules different from the battery module 906 and/or the upper backbone 904 connects one or more battery modules different from the battery module 906.

Figure 25:
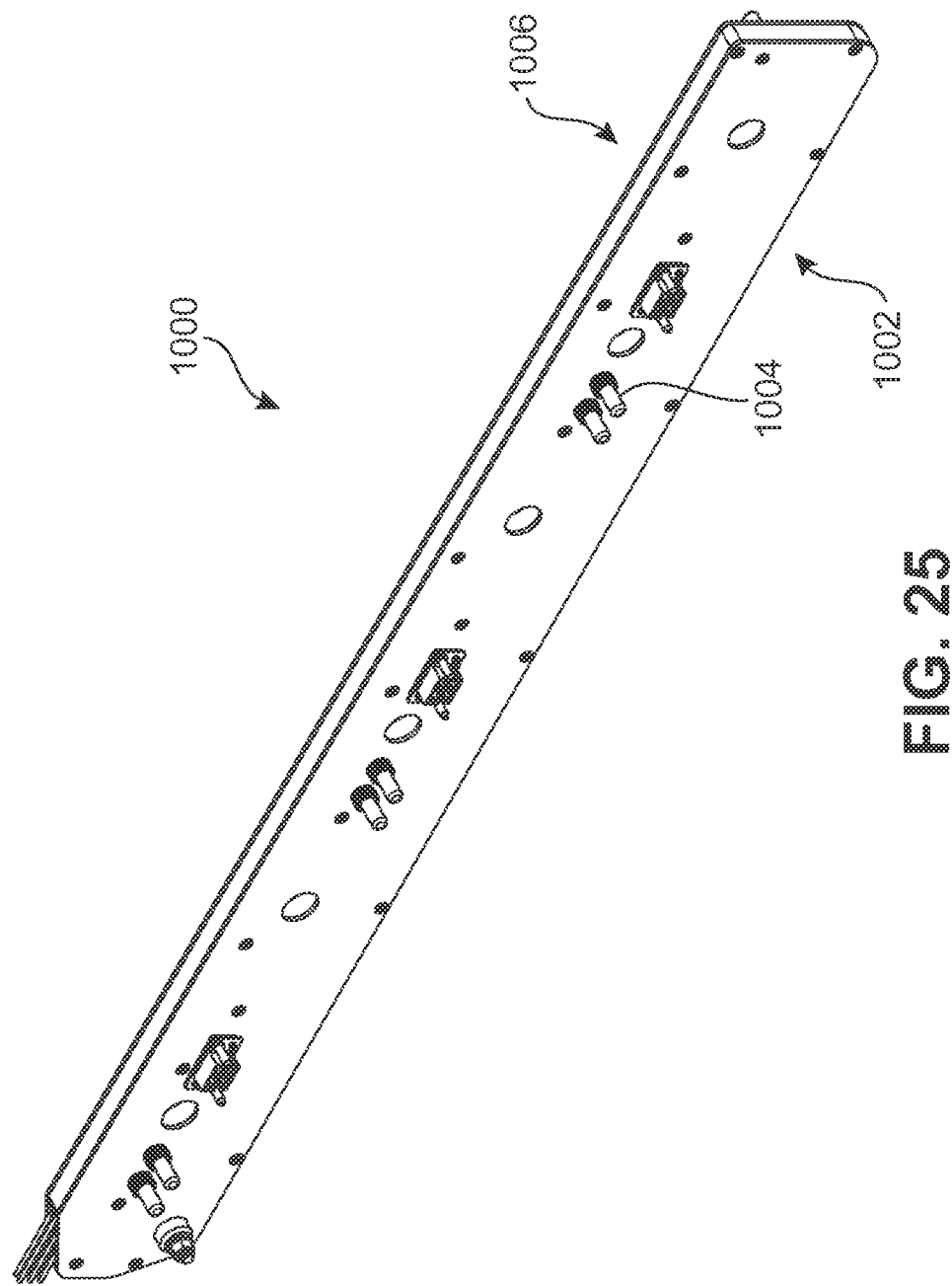
FIG. 25 is an isometric view of a first side of a backbone, in accordance with an exemplary embodiment.
Figure 26:
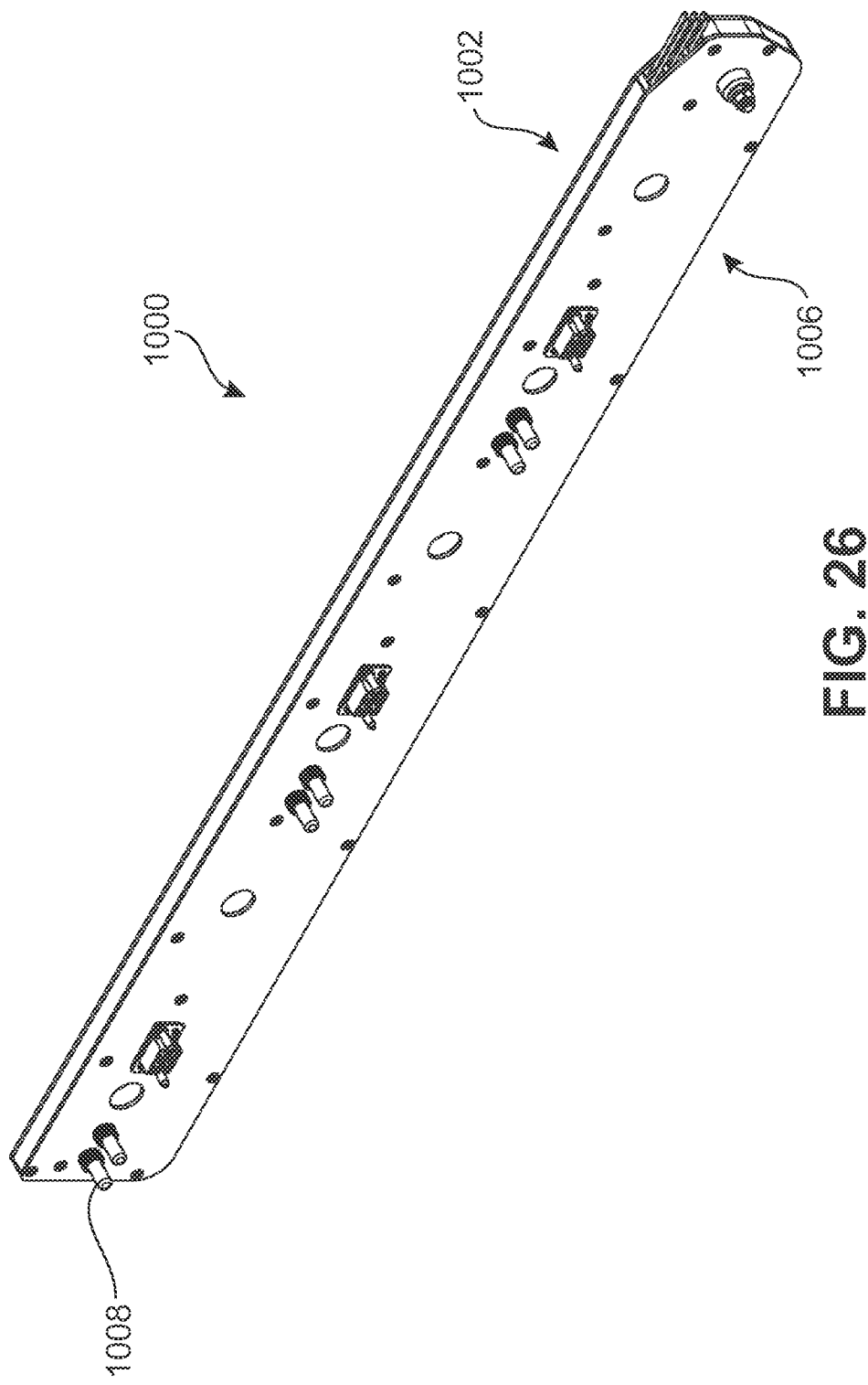
FIG. 26 is an isometric view of a second side of the backbone of FIG. 3, in accordance with an exemplary embodiment.

FIGS. 25-26 illustrate another backbone system 1000, in accordance to an exemplary embodiment. In some embodiments, the backbone system 1000 is similar to the backbone system 416 of FIG. 9. For example, the backbone system 1000 may be configured for the housing 412 and the battery module 408. In other embodiments, the backbone system 1000 is different than the backbone system 416.

In some embodiments, the backbone system may have a first side and a second side to facilitate a placement of the battery modules on opposite sides of the backbone system.

For example, as shown in FIGS. 25-26, the backbone system 1000 includes a first side 1002 having a coupling element 1004 and a second side 1006 having a back coupling element 1008. Accordingly, the backbone system may allow for battery modules to be placed on both sides of the backbone (e.g., see FIG. 9). The backbone system 1000 may include additional components, for example, coupling elements, signal connectors, through holes, blind holes, etc.

Figure 27:
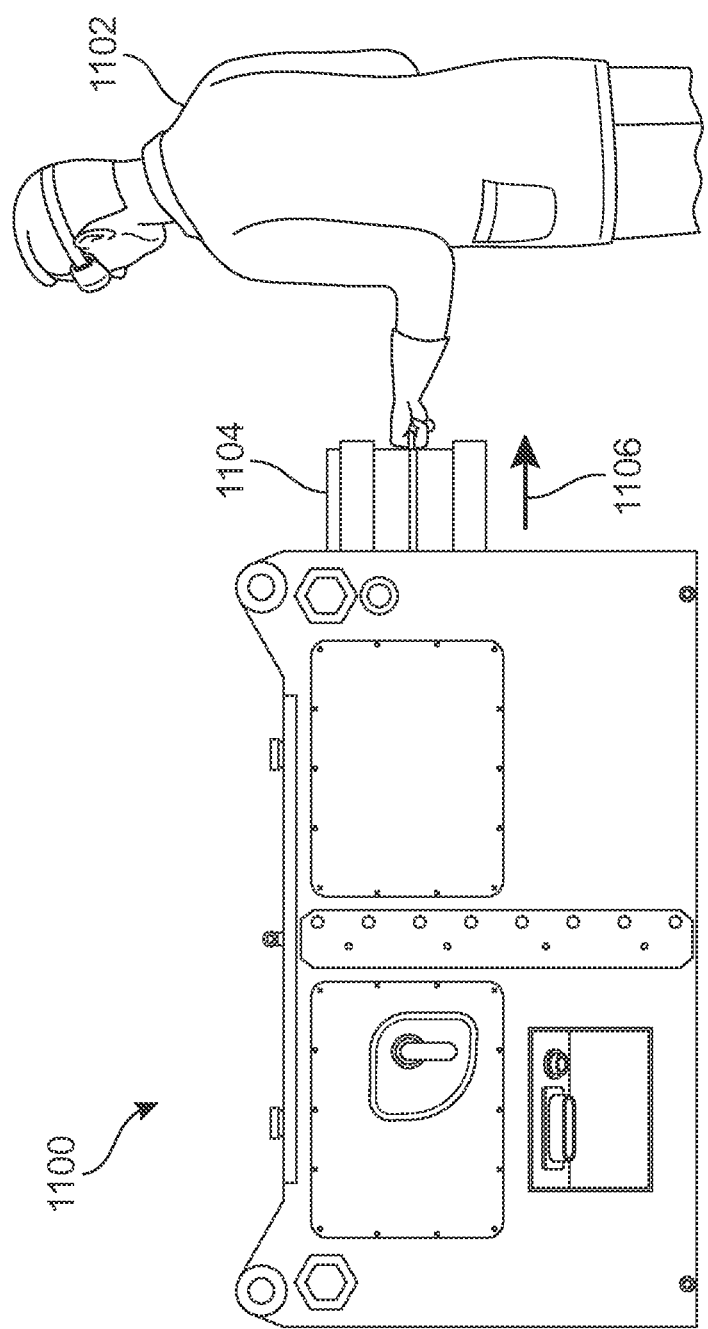
FIG. 27 is a schematic view of a method of removing a battery module from a battery system, in accordance with an exemplary embodiment.

In some embodiments, a battery system may be configured to allow removal of a battery module by pulling the battery module. For example, as illustrated in FIG. 27, a battery system 1100 allows a technician 1102 to remove the battery module 1104 by a pull force 1106. In some embodiments, an electrical output of the battery system 1100 is isolated prior to the removal of the battery module 1104 to prevent harm to the technician 1102 and/or to protect the battery system 1100.

In some embodiments, the battery system 1100 is similar to the battery system 400 of FIGS. 8-9 and/or the battery system 800 of FIGS. 22-23. For example, the battery system may contain any number of battery cells and the battery system 1100 may output any voltage. In other embodiments, the battery system 1100 is different than the battery system 400 and/or the battery system 800.

In various embodiments, the battery module 1104 is substantially similar to the battery module 700. For example, the battery module 1104 includes a first terminal similar to the first terminal 718. In another example, the battery module 1104 includes a second terminal similar to the second terminal 720. In a further example, the battery module 1104 includes a set having a first battery cell and a second battery cell similar to the set 702 having a first battery cell 704 and a second battery cell 710. In other embodiments, the battery module 1104 is different than the battery module 700.

Figure 28:
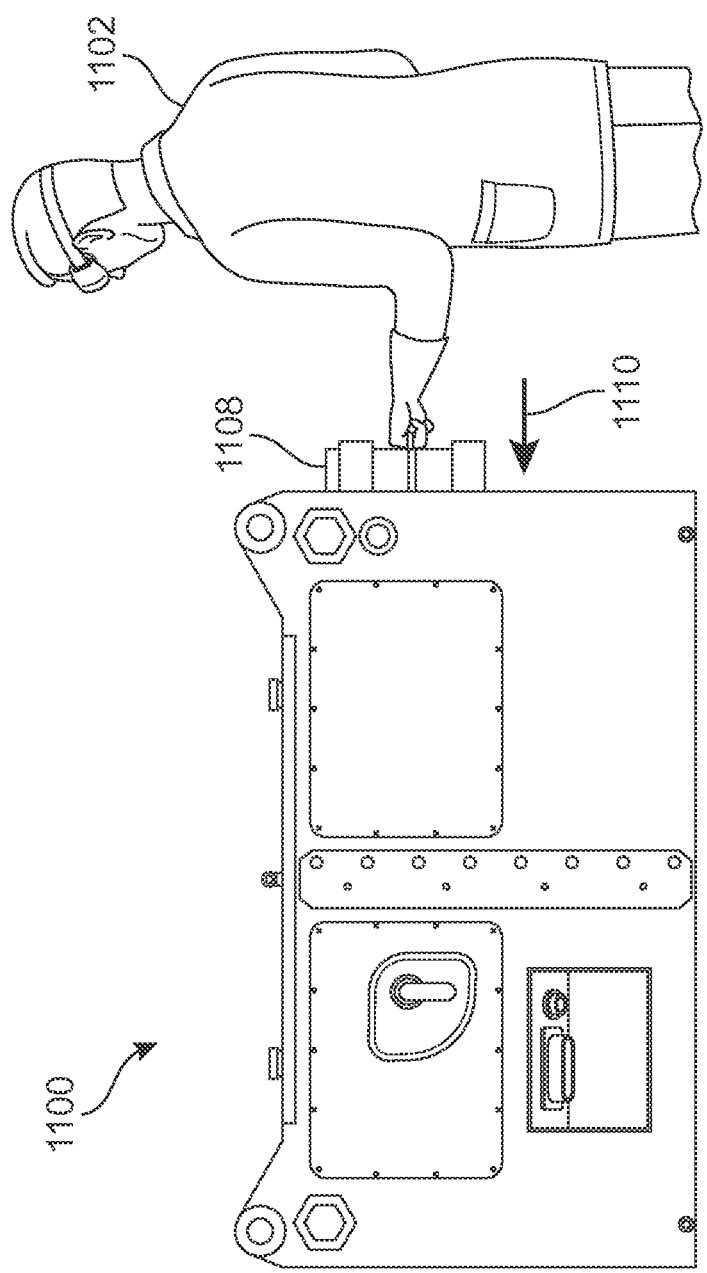
FIG. 28 is a schematic view of a method of installing a battery module into a battery system, in accordance with an exemplary embodiment.
Figure 29:
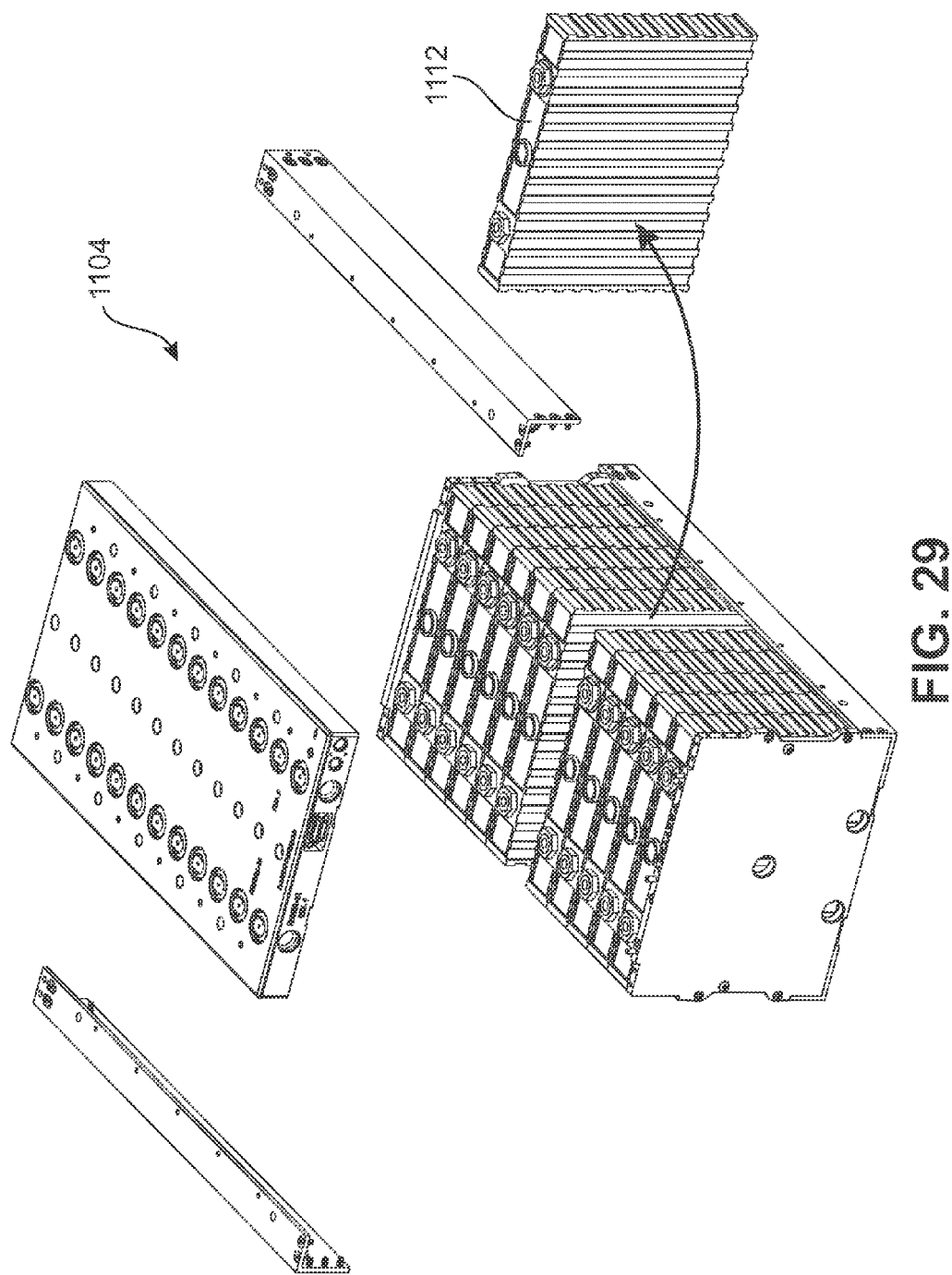
FIG. 29 is a schematic view of a method of removing a battery cell of a battery module, in accordance with an exemplary embodiment.
Figure 30:
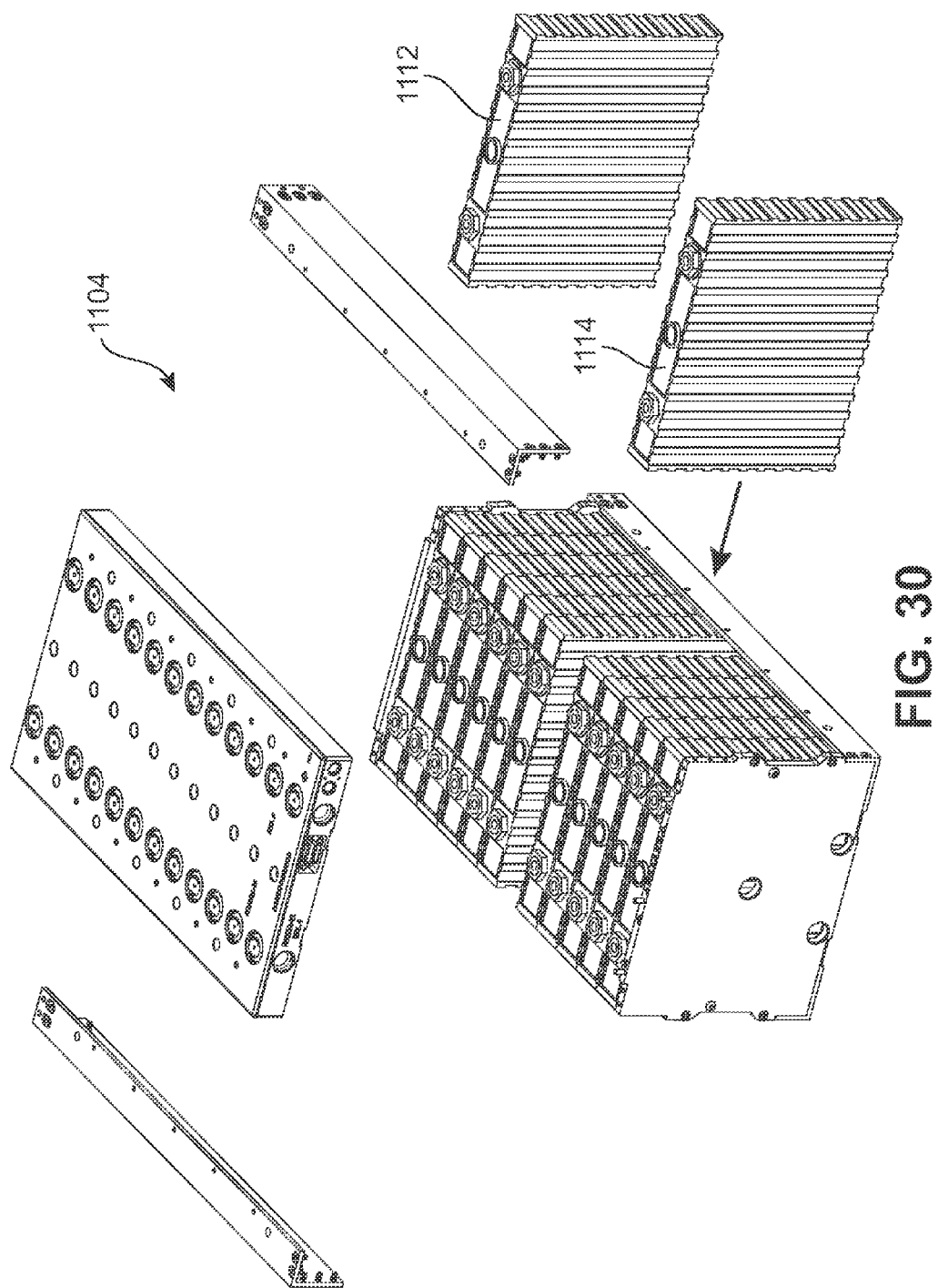
FIG. 30 is a schematic view of a method of installing a battery cell of a battery module, in accordance with an exemplary embodiment.

In certain embodiments, a battery system may be configured to allow insertion of a battery module by pushing the battery module into the battery system. For example, as illustrated in FIG. 28, the battery system 1100 allows a technician 1102 to insert a new battery module 1108 by a push force 1110. In some embodiments, the new battery module 1108 is substantially similar to the battery module 1104. For example, the new battery module 1108 and the battery module 1104 may have a same voltage level. In another example, the new battery module 1108 has a same maximum design capacity level as the battery module 1104. In yet another example, the new battery module 1108 has a same type and number of battery cells as the battery module 1104. In one example, the new battery module 1108 has a same charge level as the battery module 1104. In other embodiments, the new battery module 1108 and the battery module 1104 are different.

FIGS. 31-34 illustrate various connection schemes. As previously noted, the embodiments may use any number of battery modules, backbones, voltages, technologies, etc. Accordingly, the exemplary battery systems illustrated in FIGS. 31-34 are non-limiting examples.

Figure 31:
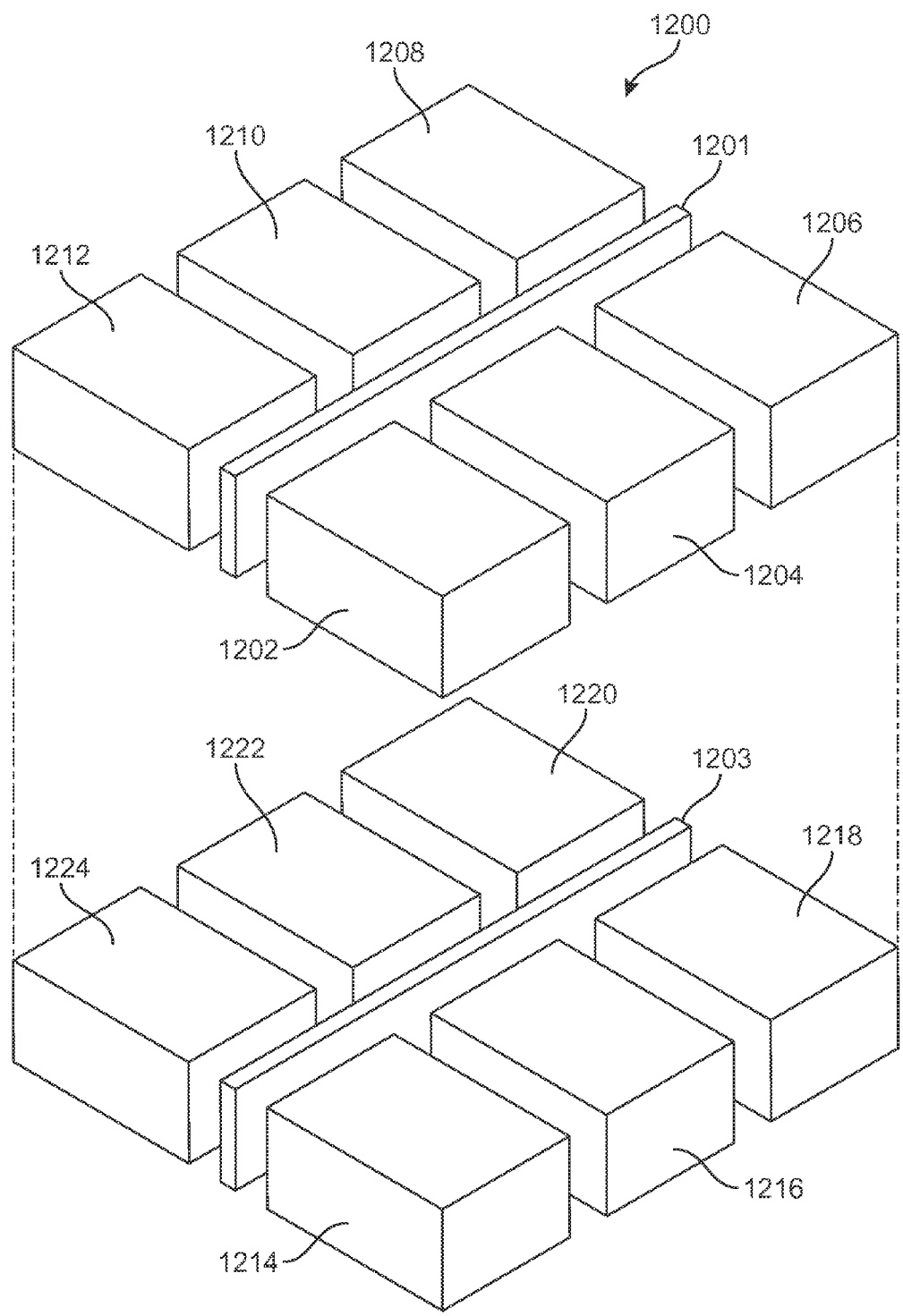
FIG. 31 is a schematic view of a battery system having twelve modules, in accordance with an exemplary embodiment.

In some embodiments, a battery system may use two backbones to connect twelve battery modules. For example, FIG. 31 illustrates a battery system 1200 having a first backbone 1201 and a second backbone 1203. As shown, the first backbone 1201 connects a first battery module 1202, a second battery module 1204, and a third battery module 1206 on one side. Additionally, the first backbone 1201 connects a fourth battery module 1208, a fifth battery module 1210, and a sixth battery module 1212 on the other side. Similarly, as shown, the second backbone 1203 connects a seventh battery module 1214, an eighth battery module 1216, and a ninth battery module 1218 on one side. Additionally, the second backbone 1203 connects a tenth battery module 1220, an eleventh battery module 1222, and a twelfth battery module 1224 on the other side.

Figure 32:
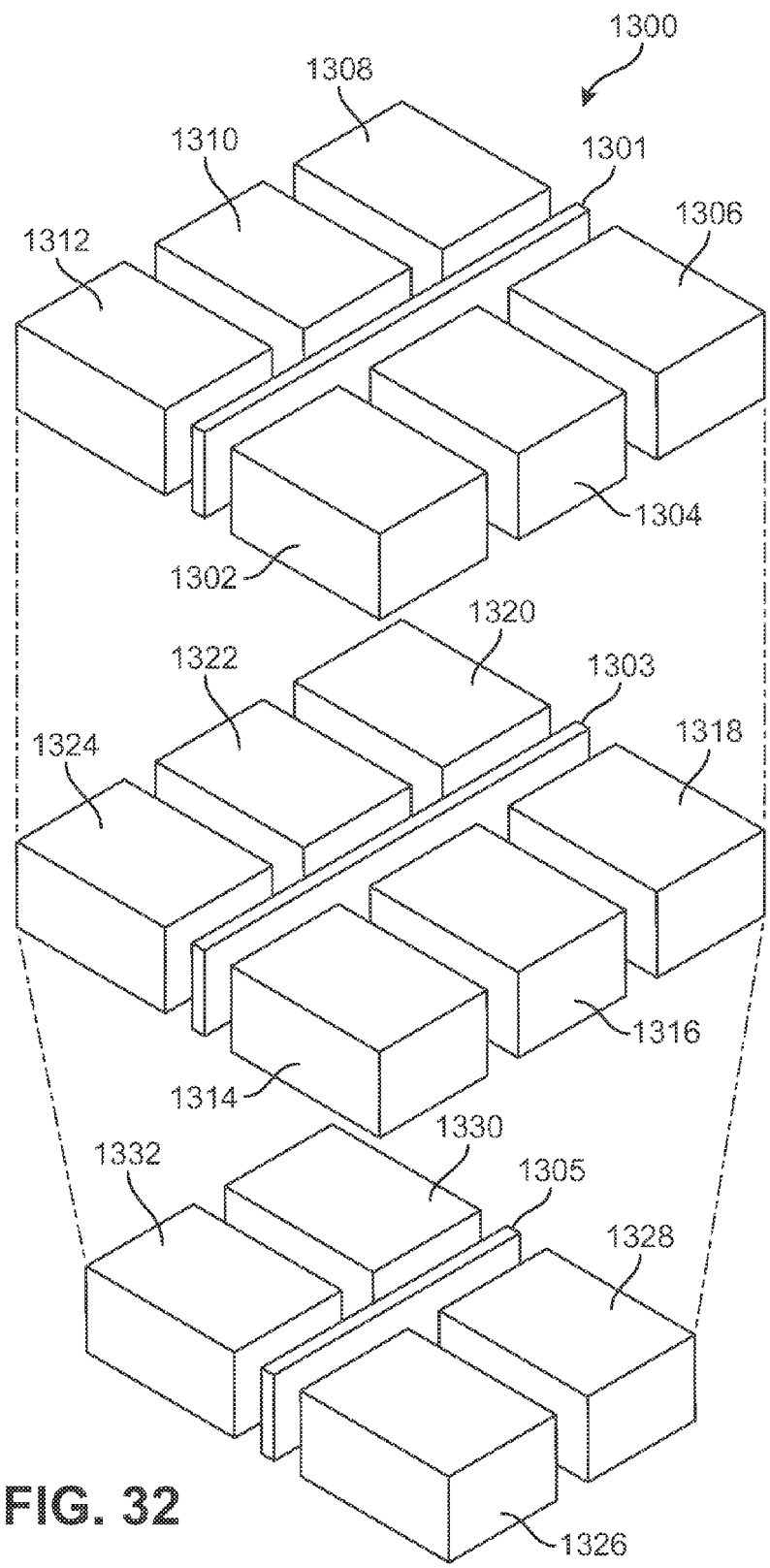
FIG. 32 is a schematic view of a first battery system having sixteen modules, in accordance with an exemplary embodiment.

In some embodiments, a battery system may use three backbones to connect sixteen battery modules. For example, FIG. 32 illustrates a battery system 1300 having a first backbone 1301, a second backbone 1303, and a third backbone 1305. As shown, the first backbone 1301 connects a first battery module 1302, a second battery module 1304, and a third battery module 1306 on one side. Additionally, the first backbone 1301 connects a fourth battery module 1308, a fifth battery module 1310, and a sixth battery module 1312 on the other side. Similarly, as shown, the second backbone 1303 connects a seventh battery module 1314, an eighth battery module 1316, and a ninth battery module 1318 on one side. Additionally, the second backbone 1303 connects a tenth battery module 1320, an eleventh battery module 1322, and a twelfth battery module 1324 on the other side. Further, as shown, the third backbone 1305 connects a thirteenth battery module 1326 and a fourteenth battery module 1328 on one side. Additionally, the third backbone 1305 connects a fifteenth battery module 1330 and a sixteenth battery module 1332 on the other side.

Figure 33:
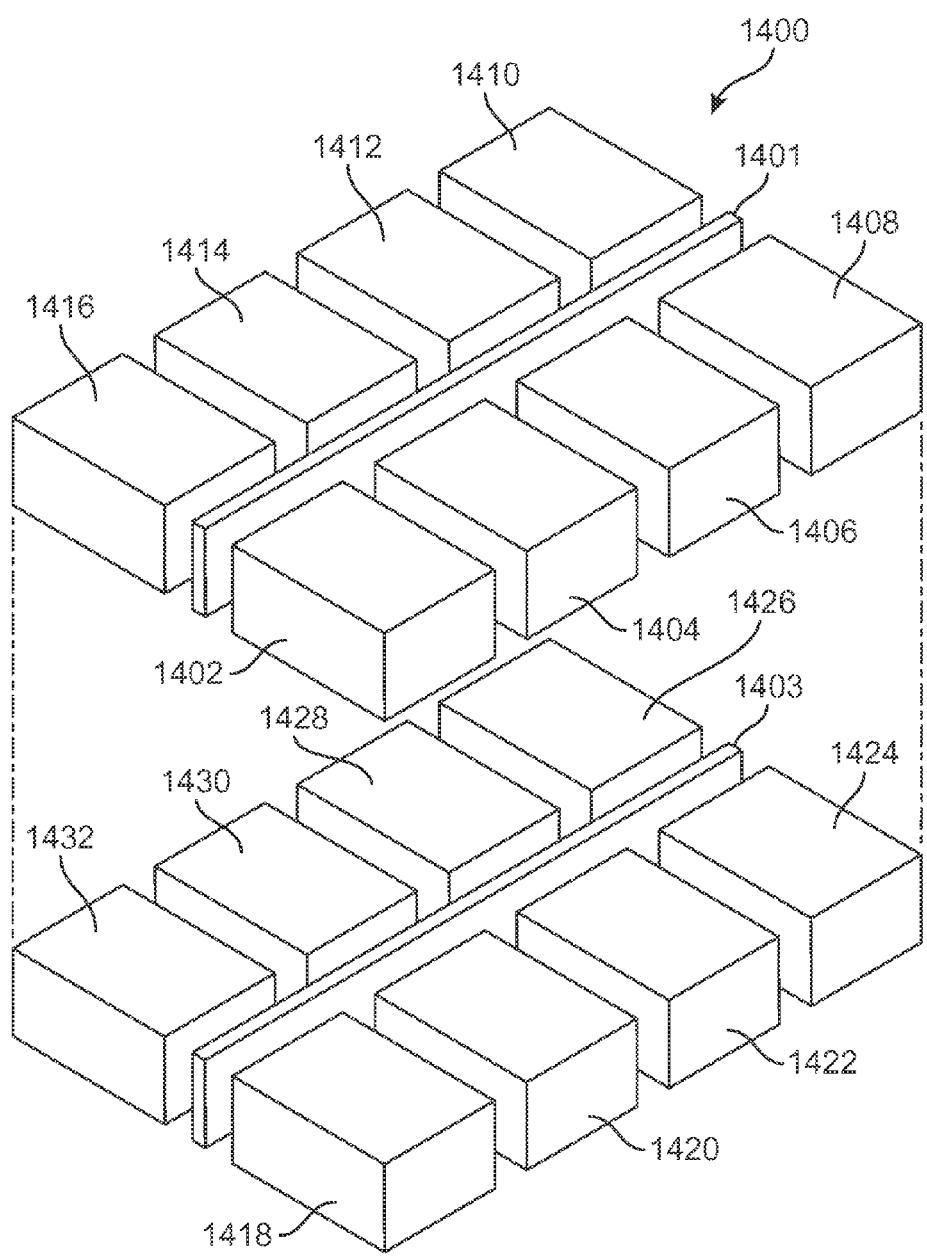
FIG. 33 is a schematic view of a second battery system having sixteen modules, in accordance with an exemplary embodiment.

In certain embodiments, a battery system may use two backbones to connect sixteen battery modules. For example, FIG. 33 illustrates a battery system 1400 having a first backbone 1401 and a second backbone 1403. As shown, the first backbone 1401 connects a first battery module 1402, a second battery module 1404, a third battery module 1406, and a fourth battery module 1408 on one side. Additionally, the first backbone 1401 connects a fifth battery module 1410, a sixth battery module 1412, a seventh battery module 1414, and an eighth battery module 1416 on the other side. Similarly, as shown, the second backbone 1403 connects a ninth battery module 1418, a tenth battery module 1420, an eleventh battery module 1422, and a twelfth battery module 1424 on one side. Additionally, the second backbone 1403 connects a thirteenth battery module 1426, a fourteenth battery module 1428, a fifteenth battery module 1430, and a sixteenth battery module 1432 on the other side.

Figure 34:
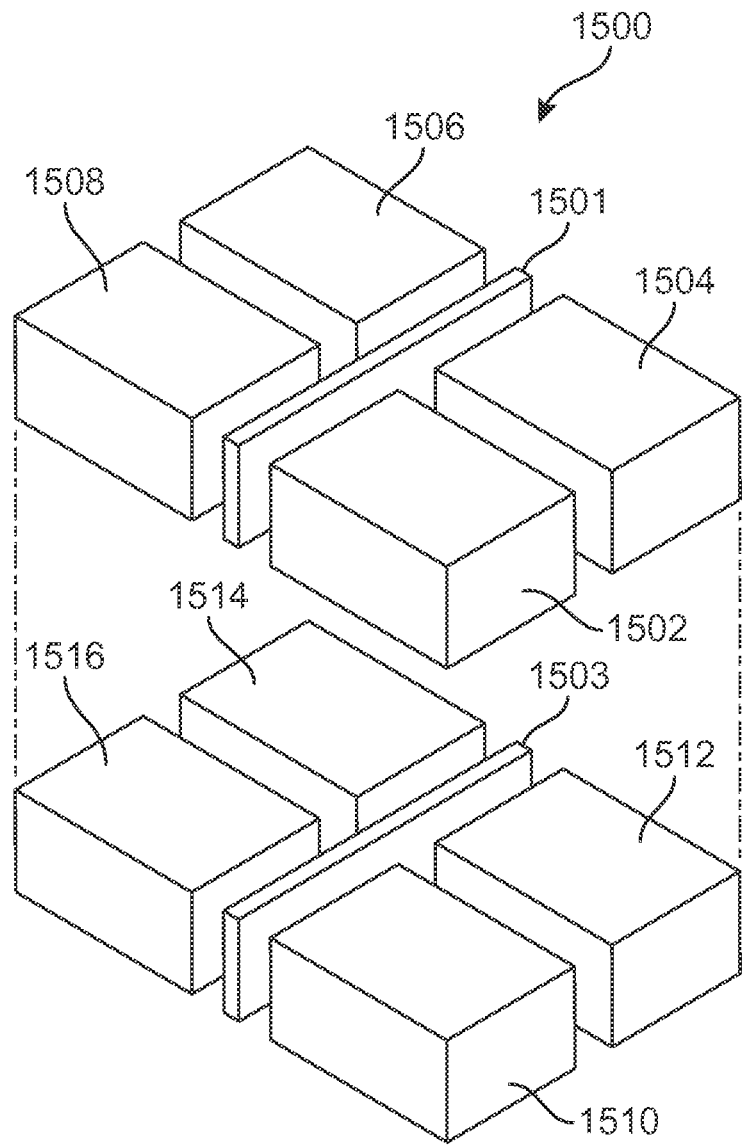
FIG. 34 is a schematic view of a battery system having eight modules, in accordance with an exemplary embodiment.

In various embodiments, a battery system may use two backbones to connect eight battery modules. For example, FIG. 34 illustrates a battery system 1500 having a first backbone 1501 and a second backbone 1503. As shown, the first backbone 1501 connects a first battery module 1502 and a second battery module 1504 on one side. Additionally, the first backbone 1501 connects a third battery module 1506 and a fourth battery module 1508 on the other side. Similarly, as shown, the second backbone 1503 connects a fifth battery module 1510 and a sixth battery module 1512 on one side. Additionally, the second backbone 1503 connects a seventh battery module 1514 and an eighth battery module 1516 on the other side.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An apparatus comprising:
   a first panel including a first upper surface and a first lower surface;
   wherein the first upper surface includes a first cavity extending into the first upper surface towards the first lower surface;
   a first bus bar within the first cavity;
   a second panel having a second lower surface in direct contact with the first upper surface;
   wherein the second lower surface extends over a substantial portion of the first cavity;
   wherein the first bus bar includes a coupling element extending outward from the first upper surface;
   wherein the second panel includes an opening;
   wherein the coupling element extends through the opening; and
   wherein the first cavity positions the coupling element to align with the opening.

2. The apparatus according to claim 1, wherein the first cavity includes an inner surface; and
   wherein the first bus bar is contained within the inner surface.

3. The apparatus according to claim 1, wherein the first bus bar and the first cavity are approximately equal in size.

4. The apparatus according to claim 1,
   wherein the first upper surface includes a second cavity extending into the first upper surface towards the first lower surface;
   wherein the apparatus further includes a second bus bar within the second cavity; and
   wherein the first bus bar is spaced from the second bus bar.

5. An apparatus comprising:
   a first panel, the first panel including a first upper surface and a first lower surface;
   wherein the first upper surface includes a first cavity extending into the first upper surface towards the first lower surface and wherein the first upper surface includes a second cavity extending into the first upper surface towards the first lower surface; and
   wherein the first cavity is spaced from the second cavity;
   a first bus bar within the first cavity;
   a second bus bar within the second cavity; and
   a second panel having a second lower surface in direct contact with the first upper surface;
   wherein the second lower surface extends over a substantial portion of the first cavity and wherein the second lower surface extends over a substantial portion of the second cavity;
   wherein the first bus bar includes a first coupling element and wherein the first bus bar includes a second coupling element;
   wherein the apparatus further includes a first terminal of a first battery module, the first terminal being mechanically coupled to the first coupling element;
   wherein the first cavity positions the first coupling element to align with the first terminal;
   wherein the second bus bar includes a third coupling element;
   wherein the apparatus further includes a second terminal of the first battery module, the second terminal being mechanically coupled to the third coupling element;
   wherein the second cavity positions the third coupling element to align with the second terminal; and
   wherein the first terminal is spaced from the second terminal.

6. The apparatus according to claim 5,
   wherein the first lower surface includes a first back cavity extending into the first lower surface towards the first upper surface;
   wherein the first back cavity is spaced from the first cavity and wherein the first back cavity is spaced from the second cavity;
   wherein the apparatus further includes:
   a first back bus bar within the first back cavity; and
   a third panel having a third upper surface in direct contact with the first lower surface;
   wherein the third upper surface extends over a substantial portion of the first back cavity.

7. The apparatus according to claim 6,
   wherein the first panel includes a hole extending from the first lower surface to the first upper surface;
   wherein the apparatus further includes a link positioned within the hole, the link being mechanically coupled to the second bus bar and the link being mechanically coupled to the first back bus bar;
   wherein the second cavity positions the second bus bar to align with the link; and
   wherein the first back cavity positions the first back bus bar to align with the link.

8. The apparatus according to claim 6, wherein the first back bus bar includes a first back coupling element and wherein the first back bus bar includes a second back coupling element;
   wherein the apparatus further includes a first back terminal of a second battery module, the first back terminal being mechanically coupled to the first back coupling element;
   wherein the first back cavity positions the first back coupling element to align with the first back terminal; and
   wherein the first battery module and the first back battery module are positioned on opposite sides of the first panel.

9. The apparatus according to claim 6, wherein the first panel, the second panel, and the third panel have substantially similar heights; and
   wherein the first panel, the second panel; and the third panel have substantially similar lengths.

10. The apparatus according to claim 5, wherein the first bus bar has a shape corresponding with a shape of the first cavity; and
    wherein the second bus bar has a shape corresponding with a shape of the second cavity.

11. The apparatus according to claim 5, wherein the first cavity is coplanar with the second cavity.

12. A battery system comprising:
    a backbone comprising:
    a first panel including a first upper surface and a first lower surface;
    wherein the first upper surface includes a first cavity extending into the first upper surface towards the first lower surface;
    a first bus bar within the first cavity, the first bus bar including a first coupling element and a second coupling element;
    a second panel having a second lower surface in direct contact with the first upper surface; and
    wherein the second lower surface extends over a substantial portion of the first cavity;
    a first bay for a first battery module, the first bay comprising a first guide pin, wherein the first coupling element extends into the first bay; and a second bay for a second battery module, the second bay comprising a second guide pin, wherein the second coupling element extends into the second bay.

13. The battery system according to claim 12, wherein the first battery module is positioned within the first bay;
   wherein the first battery module includes a first guide pin socket, a first terminal, and a second terminal;
   wherein a mechanical coupling of the first guide pin and the first guide pin socket positions the first terminal within the first bay; and
   wherein the first cavity positions the first coupling element to align with the first terminal.

14. The battery system according to claim 13, wherein the second battery module is positioned within the second bay;
   wherein the second battery module includes a second guide pin socket, a third terminal, and a fourth terminal;
   wherein a mechanical coupling of the second guide pin and the second guide pin socket positions the third terminal within the second bay; and
   wherein the first cavity positions the second coupling element to align with the third terminal.

15. The battery system according to claim 14, further comprising:
   wherein the first upper surface includes a second cavity;
   wherein the second cavity is spaced from the first cavity;
   a second bus bar positioned within the second cavity, the second bus bar including a third coupling element and a fourth coupling element;
   wherein the second lower surface extends over a substantial portion of the second cavity; and
   wherein the third coupling element extends into the first bay.

16. The battery system according to claim 15, further comprising:
   wherein the mechanical coupling of the first guide pin and the first guide pin socket positions the second terminal within the first bay; and
   wherein the second cavity positions the third coupling element to align with the second terminal.

* * * * *